US012658719B2

(12) United States Patent     (10) Patent No.:   US 12,658,719 B2

Singer et al.        (45) Date of Patent:     Jun. 16, 2026

(54) CHARGING SYSTEM FOR ELECTRIC VEHICLES

(71) Applicant: STABL Energy GmbH, Munich (DE)

(72) Inventors: Arthur Singer, Munich (DE); Ralf Neumann, Munich (DE)

(73) Assignee: STABL Energy GmbH, Munich (DE)

( * ) Notice: Subject to any disclaimer, the term of this patent is extended or adjusted under 35 U.S.C. 154(b) by 995 days.

(21) Appl. No.: 17/685,037

(22) Filed: Mar. 2, 2022

(65) Prior Publication Data

US 2022/0185127 A1     Jun. 16, 2022

Related U.S. Application Data

(63) Continuation of application No. PCT/EP2020/074613, filed on Sep. 3, 2020.

(30) Foreign Application Priority Data

Sep. 3, 2019   (EP) ..................................... 19195179

(51) Int. Cl.
    *H02J 7/00*       (2006.01)
    *B60L 53/10*      (2019.01)
             (Continued)

(52) U.S. Cl.
    CPC ............. *H02J 7/0013* (2013.01); *B60L 53/11* (2019.02); *B60L 53/53* (2019.02); *B60L 53/64* (2019.02);
             (Continued)

(58) Field of Classification Search
    CPC .......... B60L 53/11; B60L 53/53; B60L 53/63; B60L 53/64; B60L 53/67; B60L 58/12;
             (Continued)

(56) References Cited

U.S. PATENT DOCUMENTS 4,476,520 A   *   10/1984   Gallemore ............ H02M 7/483
                                        363/43
5,642,270 A   *   6/1997   Green ..................... B60L 53/11
                                        363/17

(Continued)

FOREIGN PATENT DOCUMENTS

CN        102255350 A     11/2011
CN        109274144 A      1/2019

(Continued)

OTHER PUBLICATIONS

Vasiladiotis et al., A Modular Multiport Power Electronic Transformer With Integrated Split Battery Energy Storage for Versatile Ultrafast EV Charging Stations, IEEE Transactions on Industrial Electronics, 2014, 62(5):3213-3222.

(Continued)

*Primary Examiner* — Drew A Dunn
*Assistant Examiner* — Frank Alexis Silva
(74) *Attorney, Agent, or Firm* — Quarles & Brady LLP; Yakov S. Sidorin

(57)            ABSTRACT

A charging system for electric vehicles includes a number N of charge ports, each charge port having an interface for power exchange with an electric vehicle, a number M of modular energy storage direct converter systems (MESDCS), a switchable connection matrix, and a control system. The control system is configured to control an output voltage of each MESDCS. The switchable connection matrix is configured to connect one or more selected MESDCS with each given charge port and is further configured to connect one or more selected MESDCS with a power source.

14 Claims, 12 Drawing Sheets

(51) Int. Cl.
| | |
|---|---|
| *B60L 53/53* | (2019.01) |
| *B60L 53/64* | (2019.01) |
| *B60L 53/67* | (2019.01) |
| *H02J 7/02* | (2016.01) |
| *H02M 7/00* | (2006.01) |
| *H02M 7/483* | (2007.01) |

(52) U.S. Cl.
CPC ............ *B60L 53/67* (2019.02); *H02J 7/0019* (2013.01); *H02J 7/02* (2013.01); *H02M 7/003* (2013.01); *H02M 7/483* (2013.01); *H02M 7/4835* (2021.05); *H02J 2207/20* (2020.01)

(58) Field of Classification Search
CPC ...... H02J 7/0013; H02J 7/0019; H02J 7/0024; H02J 7/0068; H02J 7/02; H02J 7/342; H02J 2207/20; H02J 2207/40; H02J 2310/48; H02M 7/003; H02M 7/49; H02M 7/483; H02M 7/4835; Y02E 60/00
USPC .......................................................... 320/126
See application file for complete search history.

(56) References Cited

U.S. PATENT DOCUMENTS

| | | | | |
|---|---|---|---|---|
| 5,642,275 | A | 6/1997 | Peng et al. | |
| 5,803,215 | A * | 9/1998 | Henze | B60L 53/14 320/109 |
| 7,135,836 | B2 * | 11/2006 | Kutkut | H02J 7/02 320/116 |
| 7,256,516 | B2 * | 8/2007 | Buchanan | H01M 10/441 307/62 |
| 7,320,078 | B2 * | 1/2008 | Balestriere | G06F 1/266 713/300 |
| 8,013,472 | B2 * | 9/2011 | Adest | H02J 3/18 307/77 |
| 8,664,803 | B2 * | 3/2014 | Urano | H02J 50/12 307/104 |
| 8,970,176 | B2 * | 3/2015 | Ballatine | H02J 1/102 307/18 |
| 9,502,960 | B2 * | 11/2016 | Weyh | H02M 7/4835 |
| 9,608,544 | B2 * | 3/2017 | Schuler | H02M 7/49 |
| 9,669,719 | B1 * | 6/2017 | Gerber | H02J 7/0029 |
| 9,680,304 | B2 * | 6/2017 | Adest | H02M 7/44 |
| 9,853,488 | B2 * | 12/2017 | Fincham | B60L 53/65 |
| 9,960,698 | B2 * | 5/2018 | Nagashima | H02J 3/381 |
| 10,065,509 | B2 * | 9/2018 | Shin | B60L 50/15 |
| 10,084,325 | B2 * | 9/2018 | Kufner | H02J 7/0019 |
| 10,355,611 | B2 * | 7/2019 | Nagashima | B60L 55/00 |
| 10,391,870 | B2 * | 8/2019 | Götz | B60L 53/62 |
| 10,404,074 | B2 * | 9/2019 | Lucas | H02P 6/17 |
| 10,442,301 | B2 * | 10/2019 | Gerber | H02J 7/04 |
| 10,442,309 | B2 * | 10/2019 | Goetz | H02M 3/1582 |
| 10,637,251 | B2 * | 4/2020 | Helling | H02J 7/0068 |
| 10,875,406 | B2 * | 12/2020 | Galin | B60L 53/50 |
| 10,886,754 | B2 * | 1/2021 | Kufner | H02J 7/0019 |
| 10,926,649 | B2 * | 2/2021 | Nagashima | H02J 3/322 |
| 10,994,628 | B2 * | 5/2021 | Heyne | H02J 7/342 |
| 11,196,264 | B2 * | 12/2021 | Helling | H02J 3/38 |
| 11,285,824 | B2 * | 3/2022 | Galin | B60L 53/50 |
| 11,309,715 | B2 * | 4/2022 | Sachs | H02J 3/388 |
| 11,390,176 | B2 * | 7/2022 | Stanfield | H02J 7/02 |
| 11,400,821 | B2 * | 8/2022 | Galin | H01R 13/6683 |
| 11,456,679 | B2 * | 9/2022 | Abarzadeh | H02M 7/5395 |
| 11,511,639 | B2 * | 11/2022 | Brombach | B60L 53/16 |
| 11,736,045 | B2 * | 8/2023 | Kuder | H02J 7/0024 318/51 |
| 11,799,392 | B2 * | 10/2023 | Helling | B60L 1/00 |
| 11,804,795 | B2 * | 10/2023 | Kong | G01D 5/204 |
| 12,124,242 | B2 * | 10/2024 | Kong | G01D 5/20 |
| 2004/0130292 | A1 * | 7/2004 | Buchanan | B60L 53/20 320/116 |
| 2004/0189251 | A1 * | 9/2004 | Kutkut | H02J 7/02 320/128 |
| 2006/0277421 | A1 * | 12/2006 | Balestriere | G06F 1/24 713/300 |
| 2012/0217932 | A1 | 8/2012 | Biebach et al. | |
| 2013/0057209 | A1 * | 3/2013 | Nergaard | B60L 1/003 320/109 |
| 2013/0069592 | A1 | 3/2013 | Bouman | |
| 2013/0320927 | A1 * | 12/2013 | Kumagai | H02J 7/0013 320/126 |
| 2014/0091622 | A1 * | 4/2014 | Lucas | H02P 6/17 318/400.04 |
| 2014/0226377 | A1 * | 8/2014 | Goetz | H02M 3/1582 363/65 |
| 2015/0008866 | A1 * | 1/2015 | Wang | B60L 58/12 320/104 |
| 2015/0077069 | A2 * | 3/2015 | Weyh | H02M 7/483 323/207 |
| 2015/0084563 | A1 * | 3/2015 | Lucas | H02P 6/17 318/400.29 |
| 2015/0130277 | A1 * | 5/2015 | Ballantine | H02J 3/381 307/26 |
| 2015/0365003 | A1 * | 12/2015 | Sadwick | H02M 3/28 363/21.01 |
| 2016/0176305 | A1 * | 6/2016 | James | H02J 3/38 307/26 |
| 2016/0181933 | A1 * | 6/2016 | James | H02J 3/322 363/17 |
| 2016/0181944 | A1 * | 6/2016 | James | H02J 3/381 363/127 |
| 2017/0047747 | A1 * | 2/2017 | Kufner | H02J 7/0019 |
| 2017/0054306 | A1 * | 2/2017 | Vo | H02J 7/0016 |
| 2017/0163035 | A1 * | 6/2017 | Zhyhinas | G05F 1/66 |
| 2017/0207631 | A1 * | 7/2017 | Helling | H02M 7/4837 |
| 2018/0162228 | A1 * | 6/2018 | Götz | H02J 1/108 |
| 2018/0162229 | A1 * | 6/2018 | Götz | H02J 7/0042 |
| 2018/0201142 | A1 * | 7/2018 | Galin | H02J 3/14 |
| 2018/0212438 | A1 * | 7/2018 | Bouman | B60L 53/63 |
| 2018/0212530 | A1 * | 7/2018 | Götz | H02M 7/4835 |
| 2018/0229613 | A1 * | 8/2018 | Rajaie | B60L 53/16 |
| 2018/0281607 | A1 * | 10/2018 | Galin | H02J 3/38 |
| 2018/0297477 | A1 * | 10/2018 | Stanfield | H02J 7/0042 |
| 2019/0109469 | A1 * | 4/2019 | Kufner | H02J 7/0019 |
| 2019/0225096 | A1 * | 7/2019 | Hiroe | B60L 53/67 |
| 2019/0241089 | A1 * | 8/2019 | Heyne | B60L 53/31 |
| 2020/0006970 | A1 * | 1/2020 | Chen | H02M 7/217 |
| 2020/0014310 | A1 * | 1/2020 | Helling | H02M 3/33569 |
| 2020/0052507 | A1 * | 2/2020 | Apeldoorn | B60L 53/20 |
| 2020/0176997 | A1 * | 6/2020 | Sachs | H02J 7/02 |
| 2020/0235582 | A1 * | 7/2020 | Helling | H02J 3/388 |
| 2020/0338997 | A1 * | 10/2020 | Goetz | B60L 58/19 |
| 2021/0008987 | A1 * | 1/2021 | Vahedi | B60L 53/11 |
| 2021/0067057 | A1 * | 3/2021 | Abarzadeh | H02M 7/4837 |
| 2021/0094427 | A1 * | 4/2021 | Galin | H02J 7/0042 |
| 2021/0101500 | A1 * | 4/2021 | Brombach | B60L 53/67 |
| 2021/0111642 | A1 * | 4/2021 | Weyh | H02M 7/483 |
| 2021/0288358 | A1 * | 9/2021 | Von Emden | H02J 7/0029 |
| 2021/0359523 | A1 * | 11/2021 | Ritchey | H02M 7/66 |
| 2022/0169131 | A1 * | 6/2022 | Galin | H02J 3/388 |
| 2022/0200492 | A1 * | 6/2022 | Kuder | H02M 7/5395 |
| 2022/0212551 | A1 * | 7/2022 | Bouman | H02J 7/00 |
| 2022/0250486 | A1 * | 8/2022 | McCalmont | H02J 7/35 |
| 2022/0314821 | A1 * | 10/2022 | Stanfield | H02J 3/322 |
| 2023/0060698 | A1 * | 3/2023 | Eckerle | H02M 1/0067 |
| 2023/0071601 | A1 * | 3/2023 | Singer | H01M 10/425 |
| 2023/0071975 | A1 * | 3/2023 | Singer | B60L 58/13 |
| 2023/0353035 | A1 * | 11/2023 | Singer | H02J 7/007194 |
| 2023/0387700 | A1 * | 11/2023 | Singer | H01M 10/441 |
| 2024/0014683 | A1 * | 1/2024 | Vahedi | B60L 53/67 |
| 2024/0310892 | A1 * | 9/2024 | King | H02J 3/007 |
| 2024/0326612 | A1 * | 10/2024 | Slepchenkov | H02J 7/0048 |
| 2024/0429735 | A1 * | 12/2024 | Ambroziak | B60L 53/126 |

FOREIGN PATENT DOCUMENTS

| | | | |
|---|---|---|---|
| DE | 10217889 | A1 | 11/2003 |
| DE | 102010027861 | A1 | 10/2011 |
| DE | 102014110410 | A1 | 1/2016 |
| DE | 102017110410 | A1 | 11/2017 |
| DE | 102017130497 | A1 | 6/2019 |

(56) References Cited

FOREIGN PATENT DOCUMENTS

| | | | | | |
|---|---|---|---|---|---|
| DE | 102018109921 | B3 | | 8/2019 | |
| DE | 102018207183 | A1 | * | 11/2019 | ........... B60L 15/007 |
| EP | 2815913 | A1 | | 12/2014 | |
| KR | 20190100654 | A | * | 8/2019 | ............. B60L 53/14 |
| WO | 2011103911 | A1 | | 9/2011 | |
| WO | 2011145939 | A2 | | 11/2011 | |
| WO | 2012072168 | A2 | | 6/2012 | |
| WO | 2013001533 | A1 | | 1/2013 | |
| WO | 2014145765 | A1 | | 9/2014 | |
| WO | 2016012247 | A1 | | 1/2016 | |
| WO | 2018122094 | A1 | | 7/2018 | |
| WO | WO-2019215157 | A1 | * | 11/2019 | ........... B60L 15/007 |

OTHER PUBLICATIONS

PCT International Search Report and Written Opinion, PCT/EP2020/074613, Nov. 25, 2020, 20 pages.

Vasiladiotis, M., et al., "Modular Converter Architecture for Medium Voltage Ultra Fast EV Charging Stations: Global System Considerations," 2012, Laboratory of Industrial Electronics (LEI), 7 pages.

European Patent Office Communications Under Rule 71(3) EPC dated Mar. 9, 2026 for EP 20764124.2, 7 pages.

* cited by examiner

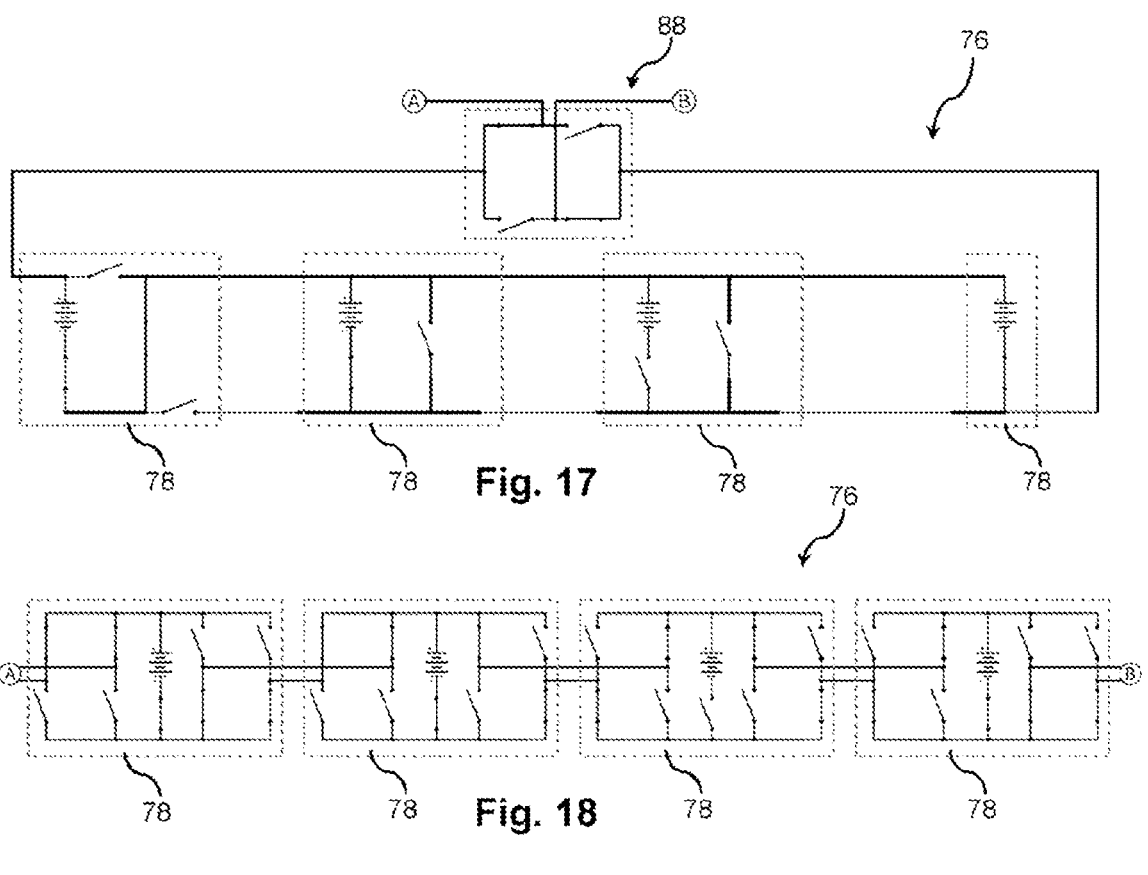
Fig. 17
Fig. 18
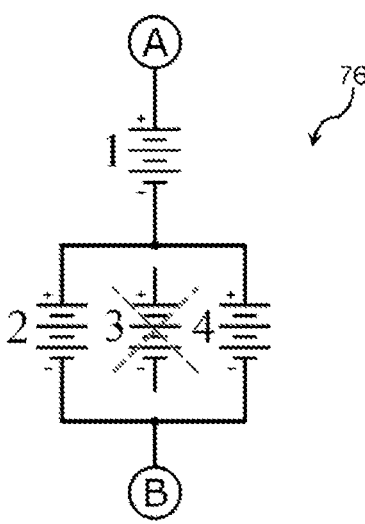
Fig. 19

CHARGING SYSTEM FOR ELECTRIC VEHICLES

CROSS-REFERENCE TO RELATED APPLICATIONS

This application is a continuation of pending International Application No. PCT/EP2020/074613 filed on Sept. 3, 2020 and now published as WO 2021/043911, which designates the United States and claims priority from European Application No. 19195179.7 filed on 3 Sep. 2019. The disclosure of each of these patent applications is incorporated by reference herein.

BACKGROUND

1. Field of the Invention

The invention relates to the field of electric mobility and more particularly to a charging system for electric vehicles.

2. Description of Related Art

The number of electric vehicles worldwide is increasing rapidly. Together with the increase in number of electric vehicles, there is a growing demand for charging systems. In prior art charging systems, typically an AC/DC converter is used, for converting an AC voltage provided by a power network to a DC voltage. Since different electric vehicles require different charging voltages, it is generally not possible to simply use this DC voltage directly for simultaneous charging different vehicles at different charge ports. Instead, in a conventional charging system, the DC voltage is supplied to a DC bus, and an additional DC/DC converter is provided between the DC bus and each individual charge port, where the DC/DC converter allows for providing the desired charging voltage.

These prior art charging systems lack flexibility to meet possibly changing charging demands. Namely, the DC/DC converters are designed for a maximum charging power and for a maximum charging voltage. If new types of electric vehicles become available that require higher charging voltages, or higher charging powers, the DC/DC converters have to be replaced. On the other hand, if the DC/DC converters are over-designed to be able to serve all types of vehicles, in-efficient use is made of the hardware most of the time. A further difficulty with the increasing demand for charging systems is the local supply with power from the power network. The costs for providing additional charging systems increase significantly, if additional medium voltage networks have to be provided for their power supply, such as networks providing a voltage of more than e.g., 1 kV and typically in a range of 10 kV to 50 kV. On the other hand, low-voltage power networks with voltages of less than 1 kV, although available at many places, usually do not provide enough power to charge a plurality of electric vehicles with high charging power at the same time. US 2013/006 9592 A1 discloses a charging system with a plurality of charge ports, a plurality of power converters for converting power from a power source to a desired format for charging a vehicle, and a switchable connection matrix for connecting at least one power converter with at least one charging port.

SUMMARY

The embodiments are providing a charging system for electric vehicles, which allows for serving different types of vehicles with different charging demands, while making optimum use of the available hardware as well as of the available power supplied from a power source, such as a power network. The electric vehicles may in some embodiments be electric cars, and in the specific examples described herein, reference is mainly made to cars for illustration purposes. However, the invention is not limited to this, but instead generally relates to any type of electric vehicle, including electric cars, motorcycles, scooters, trucks, tractors, boats, or aircraft.

In an embodiment, a charging system for electric vehicles, includes a number N of charge ports, each charge port having an interface for power exchange with an electric vehicle, a number M of modular energy storage direct converter systems (MESDCS), a switchable connection matrix, and a control system. Each MESDCS includes a converter arm having a first end and a second end and comprising a plurality of sequentially interconnected modules, wherein each module includes at least one first terminal and at least one second terminal,
a storage element for electrical energy, in particular a battery, or an energy conversion element, and
a plurality of module switches.

In each two adjacent modules, the at least one first terminal of one module is connected either directly or via an intermediate component to the at least one second terminal of the other module. The plurality of module switches allows at least for selectively deactivating the storage element or energy conversion element of each module and for connecting storage elements or energy conversion elements of adjacent modules in series. Note that the term "deactivating" a storage element or energy conversion element of the MESDCS has abroad meaning and shall only indicate that the respective element in its deactivated state does not contribute to the current or voltage provided by the converter arm of the MESDCS. In particular, this can mean that the storage element for electrical energy or energy conversion element is bypassed in a current flow through the MESDCS. For example, this may involve providing a short circuit between the at least one first terminal and the at least one second terminal of the respective module. In other words, a "deactivated" energy storage or conversion element is not deactivated per se but is only in a non-active state from the per-spective of the MESDCS.

Moreover, said control system is configured to control an output voltage of each MESDCS, based on information regarding the current charge state of the storage elements or voltage or output power of the energy conversion elements, and by means of actuating at least a part of said plurality of module switches depending on this information such that the converter arm (as a whole) supplies such output voltage. The switchable connection matrix is configured to connect, under the control of said control system, one or more selected MESDCS with each given charge port, and is further configured to connect one or more selected MESDCS with a power source.

Herein, the "power source" may typically be an electrical power network, such as a grid or mains network, or a microgrid. However, the invention is not limited to this, and the power source may for example be a solar energy plant, one or more wind turbines or the like.

The control system can be formed by an electric control unit, or a plurality of interconnected control units. Each control unit may include one or more microprocessors, or ASICs. The functionality of the control system as disclosed herein can be embodied in hardware, in software, or both.

The generic term "modular energy storage direct converter system" used herein derives from the fact that it is "modular" by being built up of modules, is capable of storing energy by means of energy storage elements, and is a "direct converter system" in as much as it is designed to actuate at least a part of said plurality of module switches, depending on the current state of charge of the storage elements (or on the current power or voltage of the energy conversion elements) in such way that the converter arm as a whole already supplies a desired output voltage. Indeed, the MESDCS can generally provide arbitrary DC output voltages or AC output voltage waveforms by means of actuating at least apart of said plurality of module switches. This way, when an MESDCS is connected to a charge port, it can provide any desired charging voltage, and in particular, both DC and AC voltages. Moreover, the same flexibility regarding the output voltages exists for the charging of the energy storage elements, which can be charged with practically any voltage applied across the converter arm, including both DC and AC voltages. Accordingly, when one or more selected MESDCS are connected with said power source, their corresponding energy storage elements can be charged by said power source. An MESDCS is described in WO2016/012247 A1.

Accordingly, the MESDCS does not only allow for converting the voltage from the power source to the desired charging voltage at the charge port, but also allows for storing energy, such that it acts as an energy buffer. This allows for providing high transient total charging powers at plural charge ports that may exceed the power that can be provided by the power source, if there is a high demand for vehicle charging, and for refilling the energy storage elements when there is less charging demand at the charging ports.

While in the specific embodiments described herein, each of the modules include a battery, it is noted that the invention is not limited to this, as the invention is also applicable to systems where other energy storage elements are employed, for example redox flow cells or capacitors, or to systems where at least part of the modules includes energy conversion elements such as solar cells, fuel cells or thermocouple elements. Accordingly, wherever in the following description explanations are made regarding a system based on batteries, it is to be understood that the corresponding disclosure should relate, where applicable, also to other forms of energy storage elements, or energy conversion elements, without further mention.

The MESDCS as defined above has a number of important advantages. For example, since the voltages associated with each individual energy storage element/energy conversion element can be comparatively low, the module switches do not have to switch high voltages. This for example allows for using standard low-voltage silicon MOSFETs instead of more expensive IGBTs or silicon carbide-MOSFETs. Moreover, switching of lower voltages by the module switches allows for a better electromagnetic compatibility and reduced total harmonic distortion.

In some embodiments, the control system is configured to ensure that no MESDCS is simultaneously connected to a phase (or "phase conductor") of the power source and to a charge port. This way, the potentials of the charge ports can be automatically separated from the potential of the phases of the power source. A full separation of the potentials of the power source on the one hand and the charge ports/electric vehicles on the other hand can then be easily obtained e.g., by ensuring that when connecting an MESDCS with a given charge port, it is not simultaneously connected with the same ground as the power source. For this purpose, a separate ground for the MESDCS can be provided, and connected with an MESDCS directly or indirectly (e.g., via a further MESDCS) when the MESDCS is connected with the charge port. Conversely, when an MESDCS is connected with the power source, or more precisely a phase or "phase conductor" of the power source, it may be further connected directly or indirectly with the ground associated with the power source. Switching between the two grounds can likewise be established by the switching matrix.

Accordingly, in an embodiment, the connection matrix is configured to connect, under control of said control system, one or more selected MESDCS directly or indirectly with a ground associated with the power source, when said one or more selected MESDCS is connected with a phase of said power source, and to disconnect said one or more selected MESDCS from the ground of the power source when said one or more selected MESDCS are connected with a charge port. In this case, the selected MESDCS can be connected directly or indirectly to a ground associated with the charge ports, as will become apparent from the detailed description below.

For charging an electric vehicle at a given charge port with a desired charging voltage, in some embodiments, the control system is configured to establish at least two, and preferably all of the following charging states:

a single charging state, in which the control system controls the output voltage of a selected MESDCS to match said desired charging voltage at said given charge port, and controls the connection matrix to connect only the selected MESDCS to said given charge port, a parallel charging state, in which the control system controls the output voltages of at least two selected MESDCS to each match said desired charging voltage at said given charge port, and controls the connection matrix to connect each of the at least two selected MESDCS to said given charge port, and a serial charging state, in which the control system controls the output voltages of a group of two or more selected MESDCS such that their sum matches said desired charging voltage at said given charge port and controls the connection matrix to connect said group of two or more selected MESDCS in series and to connect said serially connected group to said given charge port.

Herein, the parallel charging state allows for higher charging current than possible with a single MESDCS, to allow for particularly rapid charging at said given charge port. Moreover, the serial charging state allows for providing particularly high charging voltages. In both cases, the individual MESDCS do not have to be dimensioned for particularly high output voltages or output currents, instead, they can be combined in the parallel or serial charging state only when there is corresponding demand for high voltage and such a high current charging.

Note that the single charging state does not rule out that the single selected MESDCS connected to said given charge port is also connected to another charge port, in which case the given charge port and the other charge port would be connected in parallel to the single selected MESDCS. However, in some embodiments, the single charging state is a state in which one and only one MESDCS is connected to one and only one charge port. In some embodiments, said control system is configured to establish different ones of said single charging state, parallel charging state and serial charging state simultaneously for different charge ports.

In an embodiment, said control system is configured to establish a reverse charging state, in which the control system controls the output voltage of one or more selected MESDCS to a value lower than the current voltage of a battery of an electric vehicle connected to a given charge port, and controls the switchable connection matrix to connect said one or more selected MESDCS to said given charge port, such that energy storages within said one or more selected MESDCS are charged with power received from the battery of said electric vehicle connected to said given charge port. The appropriate value of the output voltage of the one or more selected MESDCS for the reverse charging depends on the present impedance and can be adjusted such as to establish a desired charging current or charging power. Graphically speaking, in the reverse charging state, the charging system "borrows" energy from the vehicle's battery, thereby effectively extending the "buffering capability" inherent to the MESDCS to vehicles connected with a charge port. This can for example be useful when the charging system is used for stabilizing the power source (e.g., mains network) to which it is connected.

Preferably, said control system is configured to establish a power source support state, in which the control system controls the output voltage of one or more selected MESDCS to a value higher than a voltage of the power source and controls the connection matrix to connect said one or more selected MESDCS to said power source. Again, the appropriate value of the output voltage of the one or more selected MESDCS for the power source support state depends on the present impedance and can be adjusted such as to establish a desired current or power. In the power source support state, energy is provided from the MESDCS to the power source. This can be expedient if there is a risk of power failure or blackout, and where the power source (e.g., mains network) can be stabilized by the MESDCS in the power source support state. However, feeding energy from the MESDCS to the power source is not only useful for emergency cases, but can be done in a routine way to compensate for expected peaks in power demand. In particular, by alternately employing the reverse charging state and the power source support state, effectively energy can be transferred from the vehicle batteries to the power source as part of the routine operation of the charging system, such that not only the MESDCS, but also the vehicle batteries act as buffers for the power system. This is particularly useful when the charging system is used for parking cars, where there is no particular time demand for charging.

Note that the above-mentioned feature, according to which the switchable connection matrix is "configured to connect, under the control of said control system, one or more selected MESDCS with each given charge port", may involve connecting a single MESDCS with a given charge port, connecting a parallel connection of two or more MESDCS with a given charge port, or connecting a series connection of two or more MESDCS with a given charge port, as is the case in the single, parallel and serial charging states, respectively. However, the same single, parallel and series connections of the MESDCS with the charge ports can also be employed in the reverse charging states. In particular, when a series connection of two or more MESDCS are connected with the charge port in the reverse charging state, said "output voltage of the one or more selected MESDCS" corresponds to the sum of the individual voltages of the MESDCS connected in series, and this total voltage may then be controlled to be lower than the voltage of the battery of the vehicle connected to said charge port. In other words, the main difference between the charging state and the reverse charging state is the direction of flow of energy, while the connections that can be provided by the connection matrix may be the same in both, the charging and reverse charging mode.

Similarly, the above-mentioned feature, according to which the switchable connection matrix is "configured to connect, under the control of the control system, one or more selected MESDCS with a power source" may involve connecting a single MESDCS with the power source (or a selected phase thereof), connecting a parallel connection of two or more MESDCS with the power source (or a selected phase thereof), or connecting a series connection of two or more MESDCS with the power source (or a selected phase thereof). Again, this applies both, to cases in which the MESDCS are to be charged by the power source, as well as to cases where the MESDCS provide energy to the power source in the power source support state. In particular, the possibility to connect a series connection of two or more MESDCS with the power source (or a selected phase thereof) may be advantageous in cases where the voltage of the power source is higher or even much higher than the voltage of the batteries to be charged. For example, consider a case where the battery of the vehicle has 400 V and the power source has 2 kV. If only a single MESDCS were to be connected with the power source, the MESDCS would have to be designed to provide a voltage of 2 kV as well, i.e., need a corresponding number of modules. This would not be an efficient use of hardware if only 400 V are required for charging. However, when the connection matrix is able to connect a series connection of say five MESDCS with the power source, each of the MESDCS would receive only 400 V, and it would hence be sufficient to design each of the MESDCS for this lower voltage, thereby making optimum use of the hardware.

In some embodiments, connecting said one or more selected MESDCS to said power source in said power source support state includes connecting said one or more selected MESDCS to a given phase of said power source, wherein the control system further controls the output voltage of said one or more selected MESDCS to follow a time varying phase voltage of said power source phase, such that it is at each instance in time higher than the time varying phase voltage, again exploiting "direct converter" capabilities of the MESDCS to output the optimum voltage waveform for supporting the AC phase of the power source. Note that the "output voltage being higher than the phase voltage" means that its magnitude is higher and that its polarity is the same as that of the phase voltage, such that MESDCS output voltage indeed at all times supports the power source phase voltage. Note that as before, the output voltage of the MESDCS is controlled such that a desired power flow or exchange of energy is obtained. In other words, while the power flow is the quantity of practical interest, the controllable output voltage of the MESDCS is adjusted such as to obtain such power flow, and in this case, a power flow that supports the power source. Note further that both the reverse charging state and the power support state can be maintained for extended periods of time, i.e., a minute or more, 10 minutes or more, 3o minutes or more, or even an hour or more. However, the duration of the reverse charging state and the power support state can be much shorter, on the order of seconds or even below, and they can be established intermittently, depending on the technical demand. For example, when the power support mode is used for purposes such as peak shaving, the power support mode can be comparatively short, on the order of seconds or minutes, while for purposes such as capacity firming or load shifting, such as to account for fluctuations in power generated by e.g. wind or sun, the power support mode could be established for longer periods of time, for example half an hour or longer.

When substituting the inertia of the spinning rotors of conventional power plants (the so-called "spinning reserve") the time horizon is also short and in the magnitude of seconds. Frequency regulation or frequency containment reserve is usually supplied in blocks of 15 minutes as this is the period for primary frequency control (where battery storage systems usually are employed) defined in the grid codes supporting the grid frequency (e.g., 50 Hz in Europe). Secondary frequency control would have a longer time horizon. Also grid disturbances like voltage drops in short time frames can be compensated (flicker compensation, voltage/power quality). The system can be also used to move the power factor "cos phi") to unity, which is referred to as "power factor correction" in the art, by providing or absorbing reactive power in order to reduce the apparent power on the power lines.

While the "power source support state" as described above was generally described as a state in which power is supplied from the MESDCS to the power source, this shall not mean to suggest that power is supplied towards the power source continuously. Instead, a power source, such as a mains network, can also be supported in manners which involve a time-dependent bidirectional power flow. In some embodiments of the "power source support state", the control system is configured to control the output voltage of said one or more selected MESDCS to cause a time dependent bidirectional power flow between the charging system and the power source such as to establish, without limitation, grid support applications like peak shaving, load leveling, flicker compensation, power factor correction, frequency containment reserve, frequency regulation, capacity firming, spinning reserve and power or voltage quality enhancement.

In some embodiments, said switchable connection matrix has a first part, said first part comprising N first terminals each connected with a corresponding one of said N charge ports, and M second terminals, each connected with a first end of a corresponding MESDCS, and wherein said switchable connection matrix is switchable, under control of said control system, to selectively connect each of said first terminals with selected one or more second terminals. Note that it is possible, but not necessary that each of the first terminals can be selectively connected to each of the second terminals. While this would give the most flexibility regarding the connection states, in practical applications this will often not be necessary. However, in some embodiments of the invention, each of the first terminals can at least be selectively connected with a subset of said second terminals.

Preferably, said first part of said switchable connection matrix further includes a number L of third terminals each connected to a corresponding phase of said power source or to ground, wherein said switchable connection matrix is switchable, under control of said control system, to selectively connect each of said third terminals with selected one or more second terminals.

In an embodiment, said switchable connection matrix is further switchable, under control of said control system, to connect two second terminals with each other, but not with any of said first terminals.

In an embodiment, said switchable connection matrix has a second part, wherein said second part of said switchable connection matrix is switchable, under control of said control system, to connect the second ends of two selected MESDCS with each other, or to connect the second end of selected MESDCS to ground.

In an embodiment, said power source is a low voltage network having a DC voltage of up to 1500 V, or an AC voltage up to 1000 V, and in particular a 230/400-volt-network or a 110 V network as customary in the USA. Such low voltage networks are widely available, such that charging systems according to this embodiment can be provided at a large variety of locations without having to provide additional or extend existing power networks. While the total power that can be provided at such low voltage networks is limited, due to the buffering provided by the energy storage elements of the MESDCS, it is nevertheless possible to provide fairly high transient charging powers, and refilling the energy storage elements at times of lower charging demands, such that the limited power provided by the low-voltage network is optimally used for efficient charging.

In alternative embodiments, said power source is a medium voltage network, with a voltage between 1 kV and 60 kV, preferably between 1 kV and 30 kV.

In various embodiments, the number N of charge ports is 3 or more, preferably 5 or more, more preferably 10 or more, and most preferably 50 or more.

In some embodiments, the charging system is configured for rapid charging, and in this case, the number M of MESDCS is preferably larger than the number N of charge ports, and in particular M:N 1.25, preferably M:N≥1.5, and most preferably M:N≥2.0. A higher ratio M:N means that there are more MESDCS available for establishing serial charging states and parallel charging states, which in turn allow for higher charging powers and hence shorter charging times. This is particularly useful for charging systems provided at roadsides of high traffic roads, such as highways or turnpikes, where most users wish to stop only shortly for charging. Various embodiments of the present invention allow for charging powers of 50 kW or more, preferably 150 kW or more or even 300 kW or more. High charging powers can be readily provided in the framework of the present invention due to the possibility of connecting two or more MESDCS in parallel and/or in series.

In alternative embodiments, the charging system is provided in a parking facility, where vehicles will be parked for appreciable periods of time, and where there is generally no need for rapid charging. In this case, the number N of charge ports is larger than the number M of MESDCS, and in particular N:M≥1.5, preferably N:M≥3.0, and most preferably N:M≥5.0. This will allow for providing charging infrastructure to a large number of parked vehicles with a comparatively low number of MESDCS, and hence low cost of the charging system.

In further embodiments, the charging system is associated with an energy consuming entity, in particular a factory, an airport, a train station, a hospital, a building or a group of buildings, wherein said energy consuming entity has a local electricity network, which under normal operation is supplied with electrical power by a power source, which may but need not be the same power source as that to which the charging system is connected, wherein said charging system includes a switching arrangement allowing for coupling some or all of the MESDCS of the charging system with said local electric network for supplying said local electric network with electrical power, and wherein said control system is configured to establish an associated entity supply mode, in which it controls the output voltages of said MESDCS coupled with said local electric network to provide power of a desired voltage to said associated entity.

In a related embodiment, said switching arrangement allowing for coupling some or all of the MESDCS of the charging system with said local electric network is provided by said connection matrix, and said coupling is carried out under control of said control system, and in particular by connecting selected ones or all of said third terminals to a corresponding phase of said local electric network. In this embodiment, the same third terminals that would be connected for example to the phases of a power network in the power source support state can hence be connected to the phases of the local electric network. Herein, said energy consuming entity may include a switching arrangement allowing for decoupling said local electrical network from its power source, thereby ensuring that the energy provided to the local electric network does not dissipate to the power network, in particular in situations where the power network is failing.

In some embodiments, the associated entity supply mode is one of an emergency backup mode to be activated in case of power failure in the power source, and a peak shaving mode, which is to be activated in case of transient demand for high power in the local electric network of said associated entity.

During said associated entity supply mode, said control system is preferably configured to establish reverse charging states for selected charge ports, in which selected MESDCS are charged with power received from the batteries of electric vehicles connected to said selected charge ports. This way, energy from the electric vehicles can be transferred to the associated entity, thereby effectively increasing the buffering capacity of the MESDCS by the capacity of the batteries of the vehicles currently connected to the charging system.

In an embodiment, a communication interface is associated with each charge port, allowing for transmitting charging parameters to the control system. Herein, the charging parameters may include one or more parameters selected from the group consisting of a desired charging voltage, a target charging level, a charging rate, a charging power, a maximum charging period, an end of charging time, information regarding a mode of payment, a vehicle identification, and a user identification. The communication interface may be a wire-based interface established when the electric vehicle is electrically connected to said charging port. In further embodiments, the charging information is provided, at least in part, automatically by the electric vehicle. Vehicles capable of automatically providing the charging information are also referred to as "smart vehicles" herein.

In alternative embodiments, the communication interface is a wireless interface, or is provided by a communication network, such as the Internet. In related embodiments, said control system is configured for communicating with an App to be installed on a user's portable network enabled device for transmitting said charging parameters. This is particularly useful in cases where the charging system is associated with a parking facility, i.e., where the electric vehicle will be connected to the charging point for an extended period of time. For example, if the charging parameter included an end of charging time at noon time, but the vehicle owner changes plan and decides to only pick up his/her car the next morning, he/she can communicate this via the app, and this can be considered in the charging strategy that is carried out by the control system. For example, close to noontime or in the early evening, where there is a high demand for energy, the energy contained in the vehicle's battery can be "borrowed" by one of the MESDCS using the reverse charging mode, and can be resupplied at night time, where there will be less demand for energy in the power network, and power can be obtained at a lower price.

In an embodiment, said communication interface allows for communicating information regarding the charging process from the control system to the electric vehicle or a network enabled device, in particular information whether one or more of a requested charging rate, target charging level, maximum charging period or end of charging time can currently be provided, and if this is not the case, suggest alternative charging parameters that can be provided.

In an embodiment, the control system is configured to receive, via said communication interfaces associated with said charge ports, charging parameters, and to establish a charging strategy based on said received charging parameters, wherein establishing a charging strategy includes selecting, for each of said ports for which charging parameters have been received, a charging state or a time sequence of charging states, selected from the following charging states:

an idle state, in which no charging takes place, a single charging state, in which the control system controls the output voltage of a selected MESDCS to match a desired charging voltage at a given charge port, and controls the connection matrix to connect only the selected MESDCS to said given charge port, a parallel charging state, in which the control system controls the output voltages of at least two selected MESDCS to each match a desired charging voltage at a given charge port, and controls the connection matrix to connect each of the at least two selected MESDCS to said given charge port, a serial charging state, in which the control system controls the output voltages of a group of two or more selected MESDCS such that their sum matches a desired charging voltage at a given charge port, and controls the connection matrix to connect said group of two or more selected MESDCS in series and to connect said serially connected group to said given charge port, and a reverse charging state, in which the control system controls the output voltage of one or more selected MESDCS to a value lower than the current voltage of a battery of an electric vehicle connected to a given charge port, and controls the switchable connection matrix to connect said one or more selected MESDCS to said given charge port, such that energy storages within said one or more selected MESDCS are charged with power received from the battery of said electric vehicle connected to said given charge port.

In some embodiments, said control system is configured to establish said charging strategy, at least in part, based on a prognosis of future charging demands. For example, future charging demands can be predicted quite reliably based on statistical and empirical information.

In an embodiment, said plurality of module switches of the modules further allow for selectively connecting storage elements or energy conversion elements of adjacent modules in anti-series. "connection in anti-series", as opposed to "connection in series" means a connection with reversed polarity. The possibility of connecting an individual module in anti-series can for example be helpful for measuring the state of health or the state of charge of the batteries included in the modules. However, the capability of freely changing their polarity of the energy storage elements in the series connection implies that the polarity of the MESDCS as a whole can be changed, allowing for providing positive and negative output voltages.

In some embodiments, at least the modules which are not the first and last in the sequential interconnection in the MESDCS each include at least two first terminals and at least two second terminals, wherein in each two adjacent modules the at least two first terminals of one module are connected either directly or via an intermediate component to a corresponding one of the at least two second terminals of the other module, and wherein said plurality of module switches of the modules further allow for selectively connecting storage elements or energy conversion elements of adjacent modules in parallel. This way, the internal resistance of the energy storage direct converter and hence the internal loss can be reduced.

In an embodiment, the plurality of module switches of the MESDCS modules allow for connecting storage elements or energy conversion elements of modules which are separated by at least one intermediate module with a deactivated storage element/conversion element selectively in parallel and in series. This variant has at least two significant advantages. One advantage is that in case one of the modules or its energy storage should be defective, the operation of the remaining modules is not compromised. The other advantage is that even nonadjacent energy storage elements/conversion elements can be selectively switched in parallel. This allows for selectively connecting energy storage/conversion elements in parallel that have identical or at least similar voltages to thereby avoid balancing currents/charge transfer between energy source/conversion elements, which would only lead to internal losses.

A further aspect of the invention relates to a method of operating a charging system for electric vehicles, said charging system comprising:

a number N of charge ports, each charge port having an interface for power exchange with an electric vehicle, a number M of modular energy storage direct converter systems (MESDCS),a switchable connection matrix, and a control system, wherein each MESDCS includes a converter arm having a first end and a second end and comprising a plurality of sequentially interconnected modules, wherein each module includes at least one first terminal and at least one second terminal, a storage element for electrical energy, in particular a battery, or an energy conversion element, and a plurality of module switches, wherein in each two adjacent modules the at least one first terminal of one module is connected either directly or via an intermediate component to the at least one second terminal of the other module, wherein said plurality of module switches allow at least for selectively deactivating the storage element or energy conversion element of each module and for connecting storage elements or energy conversion elements of adjacent modules in series, wherein said method includes controlling an output voltage of each MESDCS, based on information regarding the current charge state of the storage elements or voltage or output power of energy conversion elements, by actuating at least a part of said plurality of module switches depending on this information such that the converter arm as a whole supplies said output voltage, and wherein said operation includes connecting one or more selected MESDCS with each given charge port and includes connecting one or more selected MESDCS with a power source.

In an embodiment, the method is carried out such that it is constantly avoided that any MESDCS is simultaneously connected to the power source and to a charge port, wherein the method preferably further includes selectively connecting, by means of said connection matrix, one or more MESDCS directly or indirectly with a ground associated with the power source, when said one or more selected MESDCS is connected with a phase of said power source, and disconnecting said one or more MESDCS from the ground of the power source when said one or more selected MESDCS are connected with a charge port.

In an embodiment, for charging an electric vehicle at a given charge port with a desired charging voltage, the method includes establishing at least two, and preferably all of the following charging states:

a single charging state, in which the control system controls the output voltage of a selected MESDCS to match said desired charging voltage at said given charge port, and controls the connection matrix to connect only the selected MESDCS to said given charge port, a parallel charging state, in which the control system controls the output voltages of at least two selected MESDCS to each match said desired charging voltage at said given charge port, and controls the connection matrix to connect each of the at least two selected MESDCS to said given charge port, and a serial charging state, in which the control system controls the output voltages of a group of two or more selected MESDCS such that their sum matches said desired charging voltage at said given charge port and controls the connection matrix to connect said group of two or more selected MESDCS in series and to connect said serially connected group to said given charge port.

In an embodiment, said method includes establishing different ones of said at least two, preferably three charging states simultaneously for different charge ports.

In an embodiment, said method further includes establishing a reverse charging state, in which the output voltage of one or more selected MESDCS is controlled to assume a value lower than the current voltage of a battery of an electric vehicle connected to a given charge port, and the switchable connection matrix is controlled to connect said one or more selected MESDCS to said given charge port, such that energy storages within said one or more selected MESDCS are charged with power received from the battery of said electric vehicle connected to said given charge port.

In an embodiment, said method further includes establishing a power source support state, in which the output voltage of one or more selected MESDCS is controlled to assume a value higher than a voltage of the power source and the connection matrix is controlled to connect said one or more selected MESDCS to said power source.

In an embodiment, connecting said one or more selected MESDCS to said power source in said power source support state includes connecting said one or more selected MESDCS to a given phase of said power source, wherein the method further includes controlling the output voltage of said one or more selected MESDCS to follow a time varying phase voltage of said power source phase, such that it is at each instance in time higher than the time varying phase voltage.

In an embodiment, said switchable connection matrix has a first part, said first part comprising N first terminals each connected with a corresponding one of said N charge ports, and M second terminals, each connected with a first end of a corresponding MESDCS, and wherein said switchable connection matrix is switchable, under control of said control system, to selectively connect each of said first terminals with selected one or more second terminals.

In an embodiment, said first part of said switchable connection matrix further includes a number L of third terminals each connected to a corresponding phase of said power source or to ground, wherein said method includes selectively connecting each of said third terminals with selected one or more second terminals.

In an embodiment, said method further includes a step of connecting two second terminals with each other, but not with any of said first terminals.

In an embodiment, said switchable connection matrix has a second part, wherein said second part of said switchable connection matrix is switchable, under control of said control system, to connect the second ends of two selected MESDCS with each other, or to connect the second end of selected MESDCS to ground.

In an embodiment, said power source is
  a low voltage network having a DC voltage of up to 1500 V, or an AC voltage up to 1000 V, and in particular a 230/400-volt-network or a 110-volt-network, or
  a medium voltage network, with a voltage between 1 kV and 60 kV, preferably between 1 kV and 30 kV.

In an embodiment, the number N of charge ports is 3 or more, preferably 5 or more, more preferably 10 or more, and most preferably 50 or more.

In an embodiment, the number M of MESDCS is larger than the number N of charge ports, and in particular $M:N \geq 1.25$, preferably $M:N \geq 1.5$, and most preferably $M:N$ 2.0.

In an embodiment, the charging system is provided in a parking facility, and wherein the number N of charge ports is larger than the number M of MESDCS, and in particular $N:M \geq 1.5$, preferably $N:M \geq 3.0$, and most preferably $N:M$ 5.0.

In an embodiment, the charging system is associated with an energy consuming entity, in particular a factory, an airport, a train station, a hospital, a building or a group of buildings, wherein said energy consuming entity has a local electricity network, which under normal operation is supplied with electrical power by a power source, wherein said charging system includes a switching arrangement allowing for coupling some or all of the MESDCS of the charging system with said local electric network for supplying said local electric network with electrical pow-er, and wherein said method includes establishing an associated entity supply mode, in which the output voltages of said MESDCS coupled with said local electric network are controlled to provide power of a desired voltage to said associated entity.

In an embodiment, said switching arrangement allowing for coupling some or all of the MESDCS of the charging system with said local electric network is provided by said connection matrix, and said coupling is carried out under control of said control system, and in particular, by connecting selected ones or all of said third terminals to a corresponding phase of said local electric network.

The method further may include a step of decoupling said local electricity network from its power source.

In an embodiment, said associated entity supply mode is one of an emergency backup mode to be activated in case of power failure in the power source, and a peak shaving mode, which is to be activated in case of transient demand for high power in the local electric network of said associated entity.

The method may further include establishing, during said associated entity supply mode, reverse charging states for selected charge ports, in which selected MESDCS are charged with power received from the batteries of electric vehicle connected to said selected charge ports.

In an embodiment, a communication interface is associated with each charge port, wherein charging parameters are transmitted to the control system, wherein said charging parameters include one or more parameters selected from the group consisting of a desired charging voltage, a target charging level, a charging rate, a charging power, a maximum charging period, an end of charging time, information regarding a mode of payment, a vehicle identification, and a user identification.

In an embodiment, said communication interface is a wire-based interface established when the electric vehicle is electrically connected to said charging port, wherein preferably, the charging information is provided, at least in part, automatically by the electric vehicle In an embodiment, said communication interface is a wireless interface, or provided by a communication network, such as the Internet, wherein in particular, the method includes a step in which the control system communicates with an application software installed on a user's portable network enabled device for transmitting said charging parameters.

The method may include a step of communicating information regarding the charging process from the control system to the electric vehicle or a network enabled device, in particular information whether one or more of a requested charging rate, target charging level, maximum charging period or end of charging time can currently be provided, and if this is not the case, a step of suggesting alternative charging parameters that can be provided.

The method may further include a step of receiving, via said communication interfaces associated with said charge ports, charging parameters, and establishing a charging strategy based on said received charging parameters, wherein establishing a charging strategy includes selecting, for each of said ports for which charging parameters have been received, a charging state or a time sequence of charging states, selected from the following charging states:
  an idle state, in which no charging takes place,
  a single charging state, in which the control system controls the output voltage of a selected MESDCS to match a desired charging voltage at a given charge port, and controls the connection matrix to connect only the selected MESDCS to said given charge port,
  a parallel charging state, in which the control system controls the output voltages of at least two selected MESDCS to each match a desired charging voltage at a given charge port, and controls the connection matrix to connect each of the at least two selected MESDCS to said given charge port,
  a serial charging state, in which the control system controls the output voltages of a group of two or more selected MESDCS such that their sum matches a desired charging voltage at a given charge port, and controls the connection matrix to connect said group of two or more selected MESDCS in series, and to connect said serially connected group to said given charge port, and
  a reverse charging state, in which the control system controls the output voltage of one or more selected MESDCS to a value lower than the current voltage of a battery of an electric vehicle connected to a given charge port, and controls the switchable connection matrix to connect said one or more selected MESDCS to said given charge port, such that energy storages within said one or more selected MESDCS are charged with power received from the battery of said electric vehicle connected to said given charge port.

In an embodiment, the method further includes a step of establishing said charging strategy, at least in part, based on a prognosis of future charging demands.

In an embodiment, the method further includes a step of establishing the charging strategy, at least in part, based on the availability or the price of electric power provided from said power source, or a prognosis thereof.

In an embodiment, said plurality of module switches of the modules of each MESDCS further allow for selectively connecting storage elements or energy conversion elements of adjacent modules in anti-series.

In an embodiment, at least the modules which are not the first and last in the sequential interconnection each include at least two first terminals and at least two second terminals, wherein in each two adjacent modules the at least two first terminals of one module are connected either directly or via an intermediate component to a corresponding one of the at least two second terminals of the other module, wherein said plurality of module switches of the modules further allow for selectively connecting storage elements or energy conversion elements of adjacent modules in parallel, and preferably allow for connecting storage elements or energy conversion elements of modules which are separated by at least one intermediate module with a deactivated storage element/

In some embodiments, the method of the invention is carried out using a charging system according to any of the embodiments described above. Moreover, the present disclosure also relates to any combination of the various embodiments of the system and of the method recited above.

BRIEF DESCRIPTION OF THE DRAWINGS

In the following, the invention will be described by way of example, without limitation of the general inventive concept, on examples of embodiment and with reference to the drawings.

FIG. 17 shows an MESDCS incorporating module as shown in FIG. 15, FIG. 18 shows an MESDCS incorporating modules as shown in FIG. 16, FIG. 19 is a schematic representation of the connection of the batteries in the MESDCS of FIGS. 17 and 18.

Figure 1:
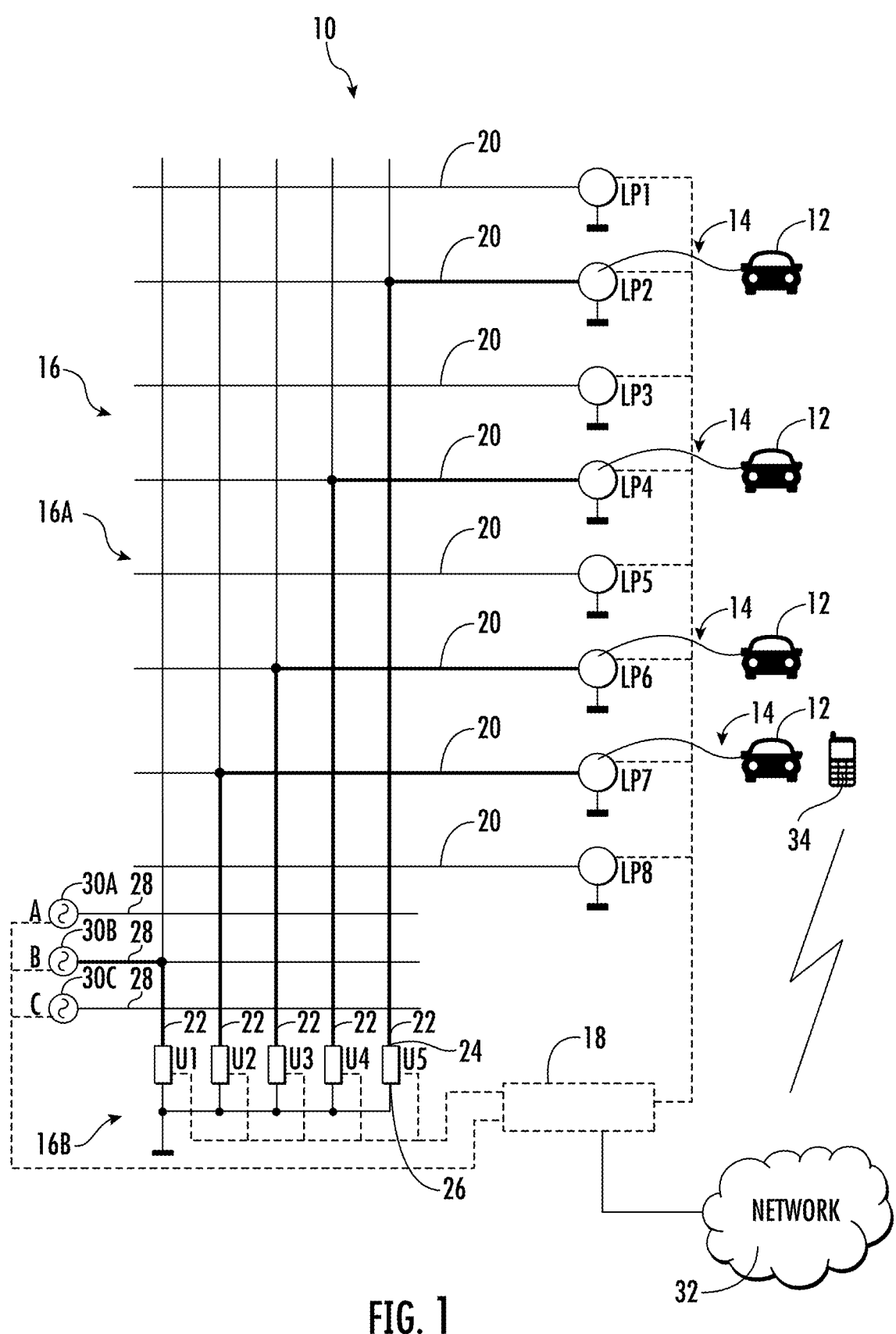
FIG. 1 is a schematic representation of a charging system, in which single charging states are established.
Figure 2:
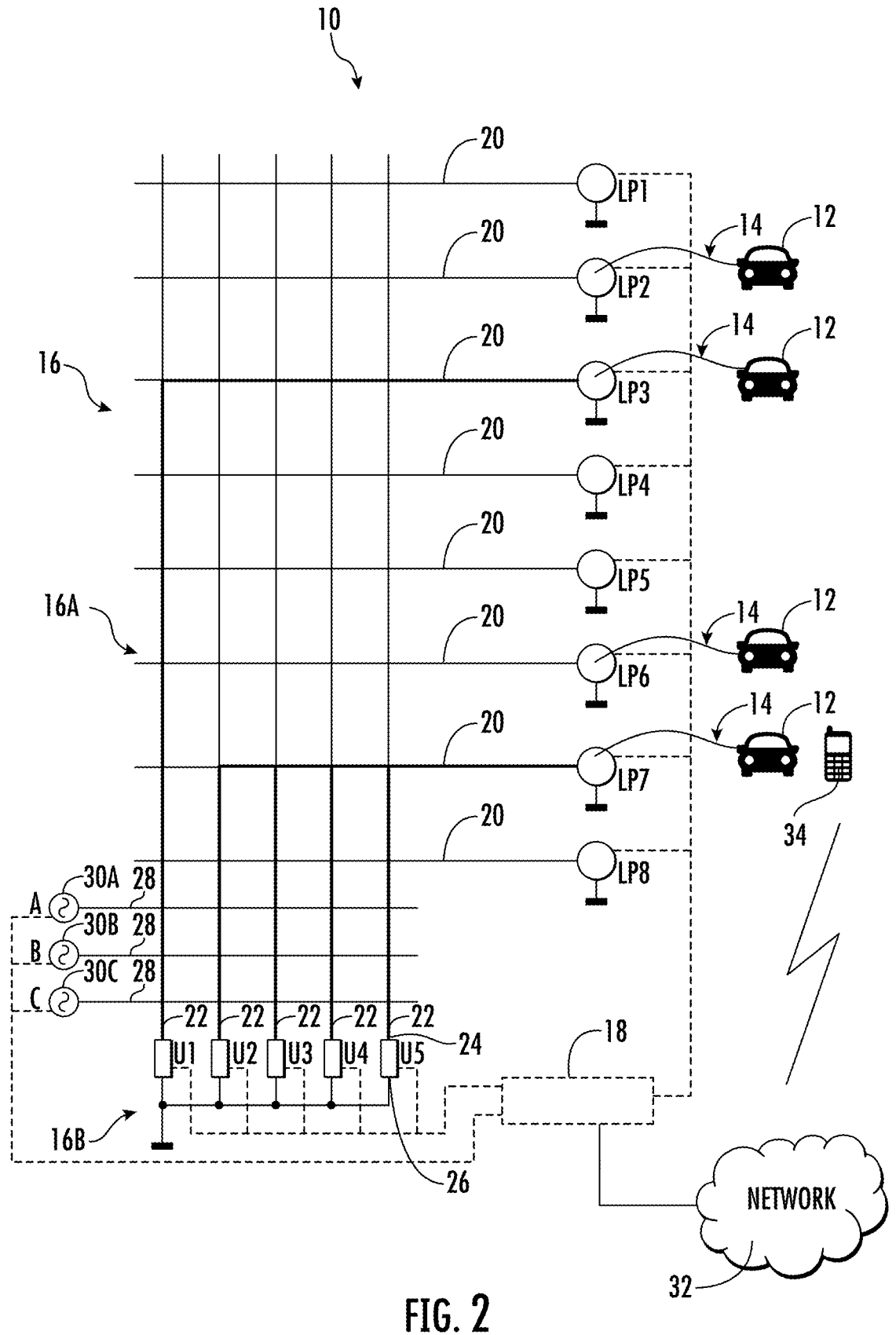
FIG. 2 is a schematic representation of a charging system, in which a single and a parallel charging state are established.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

FIG. 1 illustrates a charging system 10 for electric vehicles 12. In the embodiment shown, the charging system 10 has N=8 charge ports LP1 to LP8, each having an interface 14 for power exchange with the electric vehicle 12. Moreover, the charging system 10 further includes M=5 modular energy storage direct converter systems (MESDCS) U1 to U5 and a switchable control matrix 16 as well as a control system 18. As used herein, N and M are integer numbers defining the number of charge ports LPj (with j=1, . . . , N) and MESDCS Ui (with i=1, . . . , M), respectively. The structure and operation of the MESDCS U1 to U5 will be described in more detail with reference to FIG. 9 to 19 below.

The switchable connection matrix 16 has eight first terminals 20, each port connected with a corresponding one of said eight charge ports LP1 to LP8. Further, the switchable connection matrix 16 has six second terminals 22 each connected with a first end 24 of a corresponding MESDCS Ui (with i=1, . . . , 5). In FIGS. 1 to 4, the connection of a first terminal 20 with a second terminal 22 is indicated by a thick line. Accordingly, in the switching state of the switchable connection matrix 16 illustrated in FIG. 1, the first terminal 20 associated with charge port LP2 is connected with the second terminal 22 associated with the first end 24 of MESDCS U5, and the first terminal associated with charge port LP7 is connected with the second terminal 22 associated with the first end 24 of MESDCS U2. As mentioned in the summary of the invention, the switchable connection matrix 16 is switchable, under control of the control system 18, to selectively connect each of the first terminals 20 with selected one or more second terminals 22. In some embodiments, each of the first terminals 20 can be selectively connected to each of the second terminals 22. This would allow the largest variety of connection states. However, this is not necessary in practical applications, and in other embodiments, each of the first terminals 20 can only be selectively connected with a subset of said second terminals 22. As is seen from FIG. 1, by connecting one of the first terminals 20 with a selected one of the second terminals 22, a corresponding charge port LPj (with j=1, . . . , 8) is connected with the first end 24 of a corresponding MESDCS Ui. In the embodiment of FIG. 1, the second end 26 of each MESDCS Ui is connected to ground.

As further shown in FIG. 1, the connection matrix 16 includes three third terminals 28, which are connected with a corresponding phase 30A to 30C of a power network 30, which is an example of the "power source" referred to in the summary of the invention. Under control of the control system 18, each of said third terminals 28 can be selectively connected with selected one or more second terminals 28, such that the first end 24 of each MESDCS Ui can be selectively connected with a phase 30A to 30C of the power network 30, to thereby charge the energy storage elements included in the respective MESDCS Ui, or to feed energy from the energy storage elements of the MESDCS Ui back to the power network 3o in order to stabilize the same.

Figure 5:
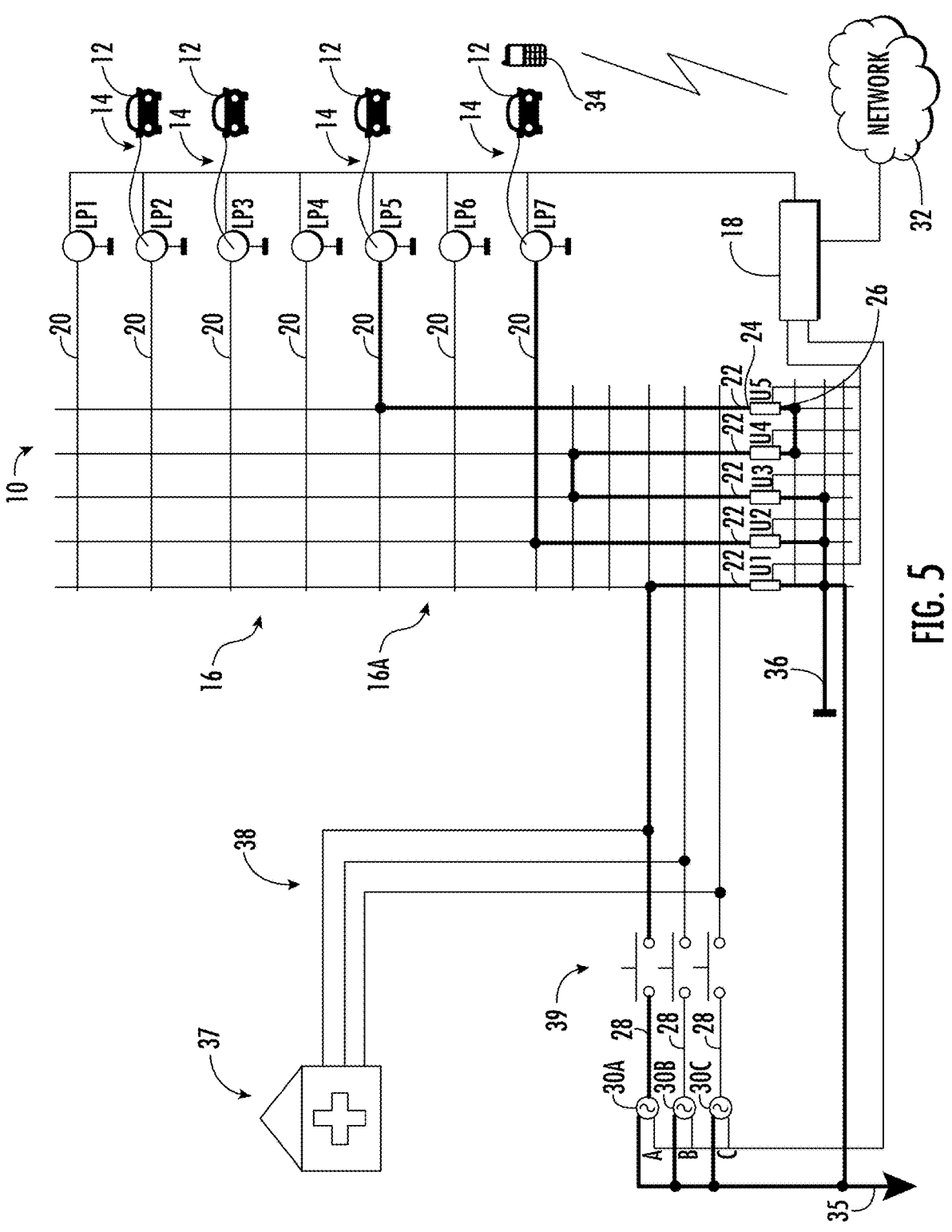
FIG. 5 is a schematic representation of a charging system, in which the power source and the charge ports are galvanically separated from each other, and in which the charging system is associated with a hospital having a local electricity network.
Figure 6:
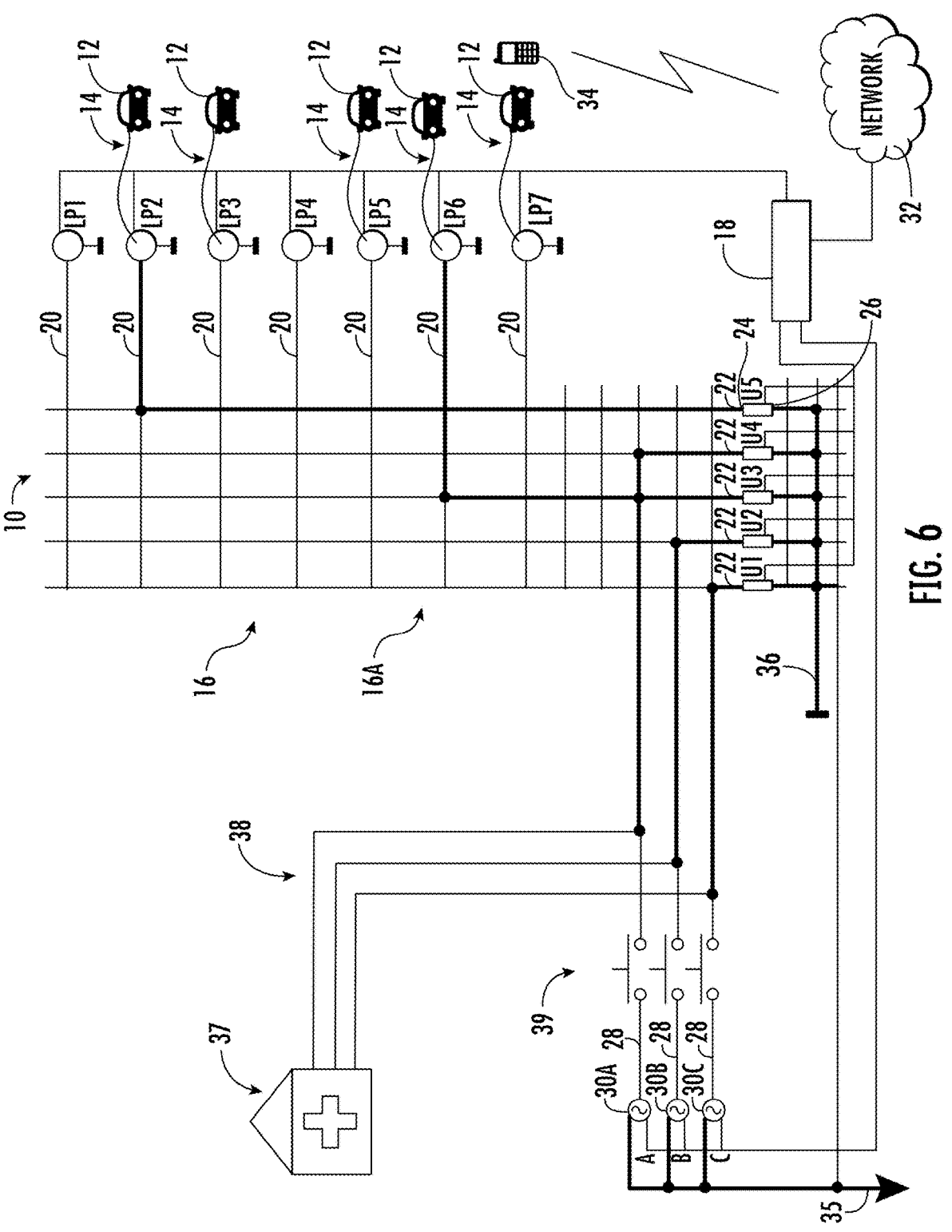
FIG. 6 is a schematic representation of the charging system according to FIG. 5, in which an entity supply mode is established, in which the hospital is supplied with electrical power from the charging system.

Importantly, in the shown embodiment, the control system 18, which controls the switching states of the connection matrix 16, is configured to ensure at all times that no MESDCS Ui is simultaneously connected to the power network 3o and to a charge port LPj. By this switching constraint, the charge ports LP1 to LP8 are at all times separated from the power network 30. However, since the MESDCS Ui on the one hand and the power network 30 on the other hand are connected to the same ground, there is no full potential separation between the power network 3o and the charge ports LPj yet. An embodiment the full charge separation is shown in FIGS. 5 and 6 below.

For charging an electric vehicle 12 at a given charge port LPj, the control system 18 is configured to establish various charging states. These charging states include a single charging state, in which the control system 18 controls the output voltage of a selected MESDCS Ui to match a desired charging voltage at said given charge port LPj and controls to the connection matrix to connect only the selected MESDCS to said given charge port. In the switching state indicated in FIG. 1, four of such single charging states are shown with respect to charge ports LP2, LP4, LP6 and LP7. Note that the "desired charging voltage" could be a DC voltage of a certain magnitude but could also be an AC voltage. The MESDCS U1 to U5 are capable of producing practically any desired DC or AC output voltage, under control of the control system 18.

Moreover, the control system 18 is configured to establish a parallel charging state, in which the control system controls the output voltages of at least two selected MESDCS to each match the desired charging voltage at the given charge port and controls the connection matrix 16 to connect each of the at least two selected MESDCS to said given charge port. Such a parallel charging state is for example illustrated in FIG. 2, where four MESDCS U2 to U5 are connected to the same charge port LP7. When using the parallel charging state, more rapid charging, or in other words, larger charging powers can be provided than in the single charging state.

Figure 3:
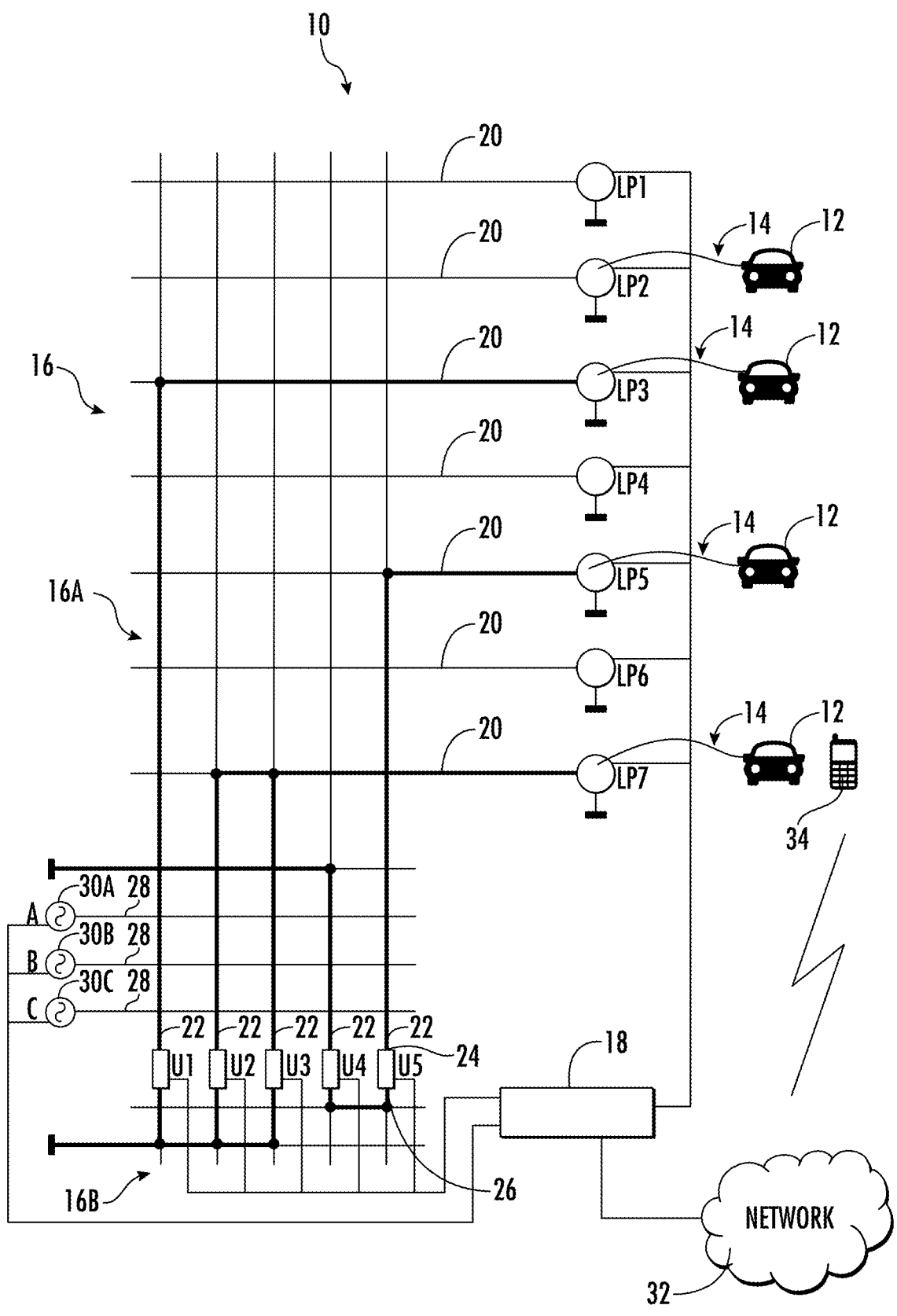
FIG. 3 is a schematic representation of a charging system, in which a single charging state, a parallel charging state and a serial charging state are established.
Figure 4:
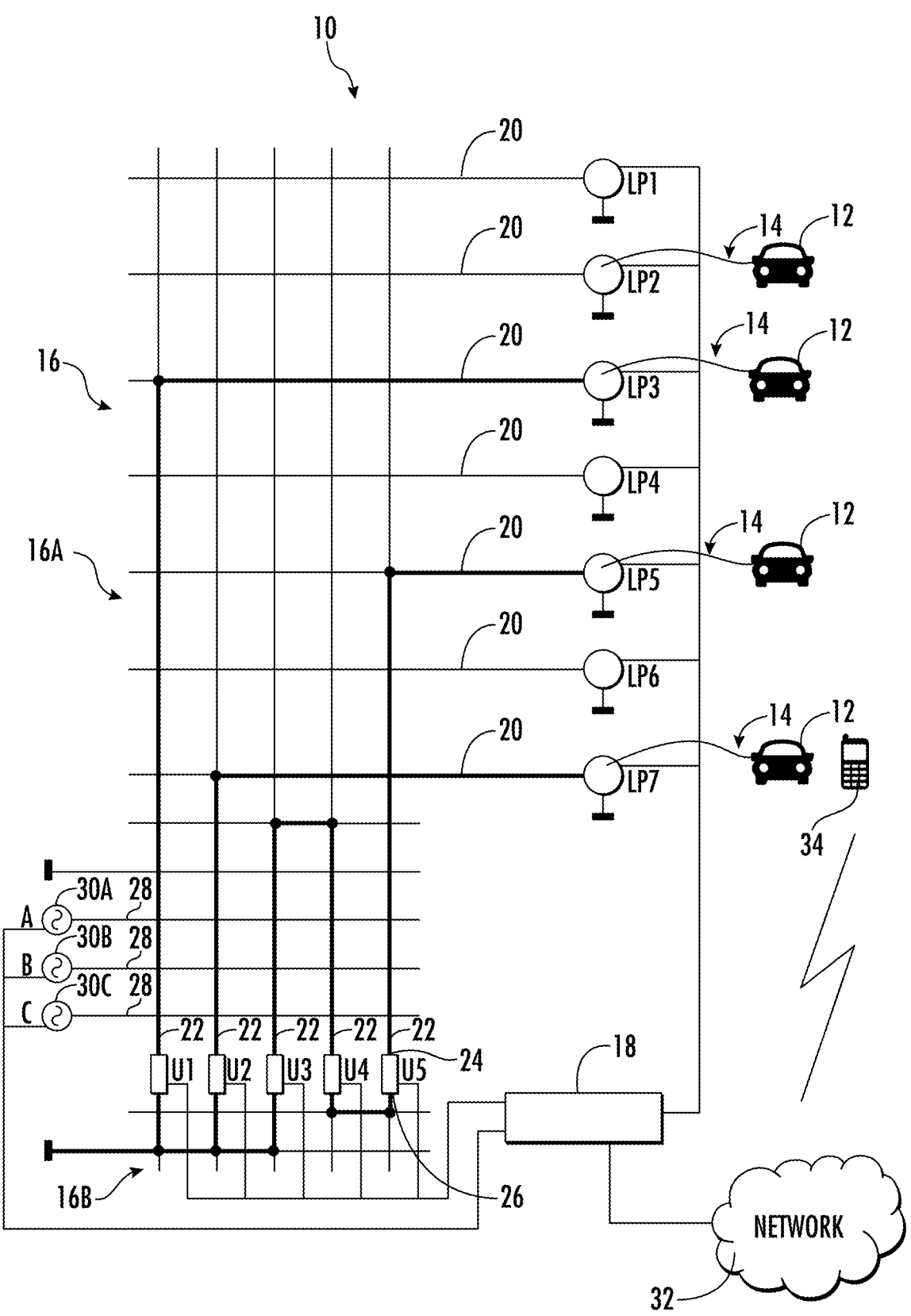
FIG. 4 is a schematic representation of a charging system, in which two single charging states and one serial charging state are established.

FIGS. 3 and 4 show an embodiment, in which in addition to the single and parallel charging states, also a serial charging state is available, in which the control system 18 controls the output voltages of a group of two or more selected MESDCS (the MESDCS U4 and U5 in FIG. 3, and the MESDCS U3, U4 and U5 in FIG. 7) such that their sum matches a desired charging voltage at a given charge port (LP5), and controls the connection matrix to connect said group of two or more selected MESDCS (U4 and U5 in FIG.

3; U3, U4 and U5 in FIG. 4) in series, and connect this serially connected group to the given charge port (LP5). For this purpose, the connection matrix 16 includes a first part 16A, which corresponds to the switching matrix 16 as shown in FIG. 1 and which includes the first, second and third terminals 20, 22 and 28, and a second part 16B which is switchable, under control of the control system 18, to connect the second ends 26 of selected MESDCS Ui with each other, as is the case for the second ends 26 of MESDCS U4 and U5 in FIG. 3 and FIG. 4, or to connect the second end 28 of selected MESDCS to ground, as is the case for Ui, U2 and U3 in FIG. 3 and FIG. 4. It is further seen that the first part 16A of the switching matrix 16 is switchable to connect two second terminals 22 with each other, but not with any of said first terminals 20. This is the case for the second terminals 22 associated with the MESDCS U3 and U4 shown in FIG. 4. In the serial charging state, by connecting several MESDCS Ui in series, it is possible to generate higher charging voltages at the given charge port (LP5 in FIG. 3 and FIG. 4) than within the single or parallel charging state.

As apparent from the exemplary FIG. 1 to 4, the control system 18 is configured to establish different ones of the single charging state, parallel charging state and serial charging states simultaneously for different charge ports LP1 to LP7. For example, FIG. 3 shows a situation in which a single charging state is established for charge port LP3, a parallel charging state is established for charging port LP7, and a serial charging state is established for charge port LP5.

While in the examples of FIG. 1 to FIG. 4, the illustrated connection between the MESDCS U1 to U5 and the charge ports LP1 to LP7 were established for charging the vehicles 12 at the respective charge ports LP1 to LP7, the same connections can also be used to establish a reverse charging state, in which energy is transmitted from the batteries of the vehicles 12 to the energy storage elements of the MESDCS Ui. For this purpose, the control system 18 controls the output voltage of one or more selected MESDCS Ui to a lower value than the current voltage of a battery of an electric vehicle 12 connected to a given charge port LPj and controls the switchable connection matrix 16, 16A, 168 to connect the one or more selected MESDCS Ui to the given charge port LPj, such that energy storages within the one or more selected MESDCS Ui are charged with power received from the battery of said electric vehicle 12 connected to the given charge port LPj. In this reverse charging state, the charging system 10 "borrows" energy from the vehicles battery, which can then be provided to another vehicle 12 to be charged by the charging system 10, or to the power network 30.

Power can be provided from the charging system 10 to the power network 3o in the "power source support state" referred to in the summary of the invention, in which the control system 18 controls the output voltage of one or more selected MESDCS Ui to a value higher than a voltage of the power source 30, and controls the connection matrix 16, 16A, 168 to connect said on or more selected MESDCS Ui to the power source 30. This can be done to protect the power system, such as the power network 30, if there is a risk of breakdown of the power network. In other words, the charging system 10 can provide a power safety margin that needs to be kept on reserve at all times to prevent breakdown of a power network 30. The power support state can be employed in different grid services, including, but not limited to frequency regulation (frequency containment reserve), peak shaving, spinning reserve, capacity filming, load level-ling, power quality, flicker compensation, uninterruptible power supply, reactive power compensation etc.

However, the power support state is not only useful for avoiding power failures, but can also be used in a planned way, to support the power network 3o in expected periods of high power demand. This is particularly useful in cases where the charging system 10 is provided in a parking facility, where the vehicles 12 would be connected to the charge ports LP1 to LP8 during the entire time of parking, and could offer the vehicle battery to act as an energy buffer for the power network 3o during the entire parking time, provided that the battery of the vehicle 12 is sufficiently charged at the end of parking. In such applications, there would be a comparatively large number of charge ports LPj that would be served by a comparatively low number of MESDCS Ui. Note that adding additional charging ports LPj to the system 10 while maintaining the number of MESDCS Ui the same does not significantly the costs of the system io, such that it is indeed cost efficient to provide a large number of parking spots with charge ports LPj, while choosing the number of MESDCS Ui low enough such that they will not be idle in normal operation.

While not explicitly shown in FIG. 1 to 4, the systems 10 shown therein allow not only for connecting a single MESDCS with the power source 30 (or a selected phase thereof), as e.g. shown for MESDCS U1 in FIG. 1, but also for a parallel connection of two or more MESDCS Ui with the power source 30 (or a selected phase thereof), or, in the case of the systems of FIGS. 3 and 4, for connecting a series connection of two or more MESDCS Ui with the power source 30 (or a selected phase thereof). Importantly, this applies both to cases in which the MESDCS Ui are to be charged by the power source 30, as well as to cases in which the MESDCS Ui provide energy to the power source 3o in the power source support state. As was mentioned above, the possibility to connect a series connection of two or more MESDCS Ui with the power source 30 (or a selected phase thereof) is particularly useful in systems where the voltage of the power source 3o is considerably higher than the voltage of the batteries of the vehicles 12 to be charged. The reason for this is that in this series connection, each of the MESDCS Ui only receives a fraction of the voltage of the power source 30, such that the individual MESDCS Ui do not need to be adapted for the (high) voltage of the voltage source 30. It is further emphasized that the second part 168 of the connection matrix 16 may be larger than shown in FIGS. 3 and 4, i.e., may include a larger number of horizontal connection lines to thereby facilitate connecting a larger number of MESDCS Ui in series and to connect this series connection with the power source 30. Moreover, it is understood that in practical limitations, the number of MESDCS Ui may be much larger than shown in the present figures, thereby allowing to connect a significant number of MESDCS in series.

FIG. 5 shows a further charging system 10 similar to the one of FIG. 4, which mainly differs in two ways. According to a first difference, two separate grounds 35, 36 are provided for the power network 3o and the charge ports LPj, respectively. By means of the second part 16B of the matrix 16, the second end 26 of each MESDCS Ui can be selectively connected with the ground 35 associated with the power network 30, in case the first end of the MESDCS Ui is connected with a phase 30A to 30C of the power network 30. This is the case for MESDCS U1 in FIG. 5, whose first end 24 is connected with phase 3oA of the power network 30, and whose second end 26 is connected with the ground 35 of the power network 30. Moreover, any MESDCS Ui that is currently connected with a charge port LPj, either alone (as is the case for U2), in a series connection (as is the case for U3, U4 and U5), or in a parallel connection (not shown in FIG. 5), is connected directly or indirectly with a separate ground 36, which is different from the ground 35 of the power network 3o and which forms a separate ground potential of the charge ports LPj. This way, a galvanic separation between the power network 3o and the charge ports LPj is ensured at all times, by the design of the connection matrix 16 and the control provided by the control system 18.

The second difference is that the charging system 10 of FIG. 5 is associated with an energy consuming entity, which in the shown example is a hospital 37. The hospital 37 has a local electricity network 38 which under normal operation is supplied with electrical power by the power network 30 as well.

The hospital 37 includes a switching arrangement 39 allowing for decoupling said local electricity network 38 from the power network 30. In the embodiment shown in FIG. 5, this switching arrangement 39 is formed by three power switches each associated with a corresponding phase 30A to 30C of the power network 30. Accordingly, in case of a failure of the power network, the local electricity network 38 can be separated therefrom and can be maintained, at least in part, with power stored in the MESDCS Ui and possibly the batteries of vehicles 12 currently connected with the charge ports LPj of the charging system io, as will be described in more detail below.

In the embodiment shown in FIG. 5, the "switching arrangement allowing for coupling some or all of the MESDCS Ui of the charging system 10 with said local electric network 38" that was referred to in the summary of the invention is simply formed by the connection matrix 16, under the control of control system 18, which as described above allows for connecting one or more selected MESDCS Ui with a phase 3oA to C of the power network 30, and thereby also allows for connecting the same to the local electricity network 38, as seen from FIG. 5. The control system 18 is configured to establish an associated entity supply mode, in which it controls the output voltages of said MESDCS Ui coupled with said local electric network 38 to provide power of a desired voltage to said hospital 37. With this setup, the "associated entity supply mode" is very similar with the "power source support state", except that in the former the power network 3o is separated from the local electricity network 38, such that the power provided by the charging system 10 is received by the local electricity network 38, and hence the hospital 37, only. A typical application for this would be to provide an emergency backup for the case of a power failure of the power network 30, which is of particular importance in case of hospitals.

During the associated entity supply mode, the control system 18 is configured to establish reverse charging states for selected charge ports LPj, in which selected MESDCS Ui are charged with power received from the batteries of electric vehicles 12 connected to said selected charge ports LPj. This is shown in FIG. 6, where the hospital 37 and the charging system 10 are separated from the power network 3o by the switching arrangement 39, where Ui, U2 and U4 are connected with corresponding phases of the local electricity network 38, and where U3 and U5 are connected with charge ports LP6 and LP2, respectively, to "borrow" energy from the batteries of the associated vehicles 12 in reverse charging states. Naturally, the selection of MESDCS Ui presently connected with the selected charge ports LPj for reverse charging and of MESDCS Ui presently connected with phases of the local electricity network 38 can be interchanged, such that the energy storage elements of the individual MESDCS Ui will be alternatingly charged and discharged.

Figure 7:
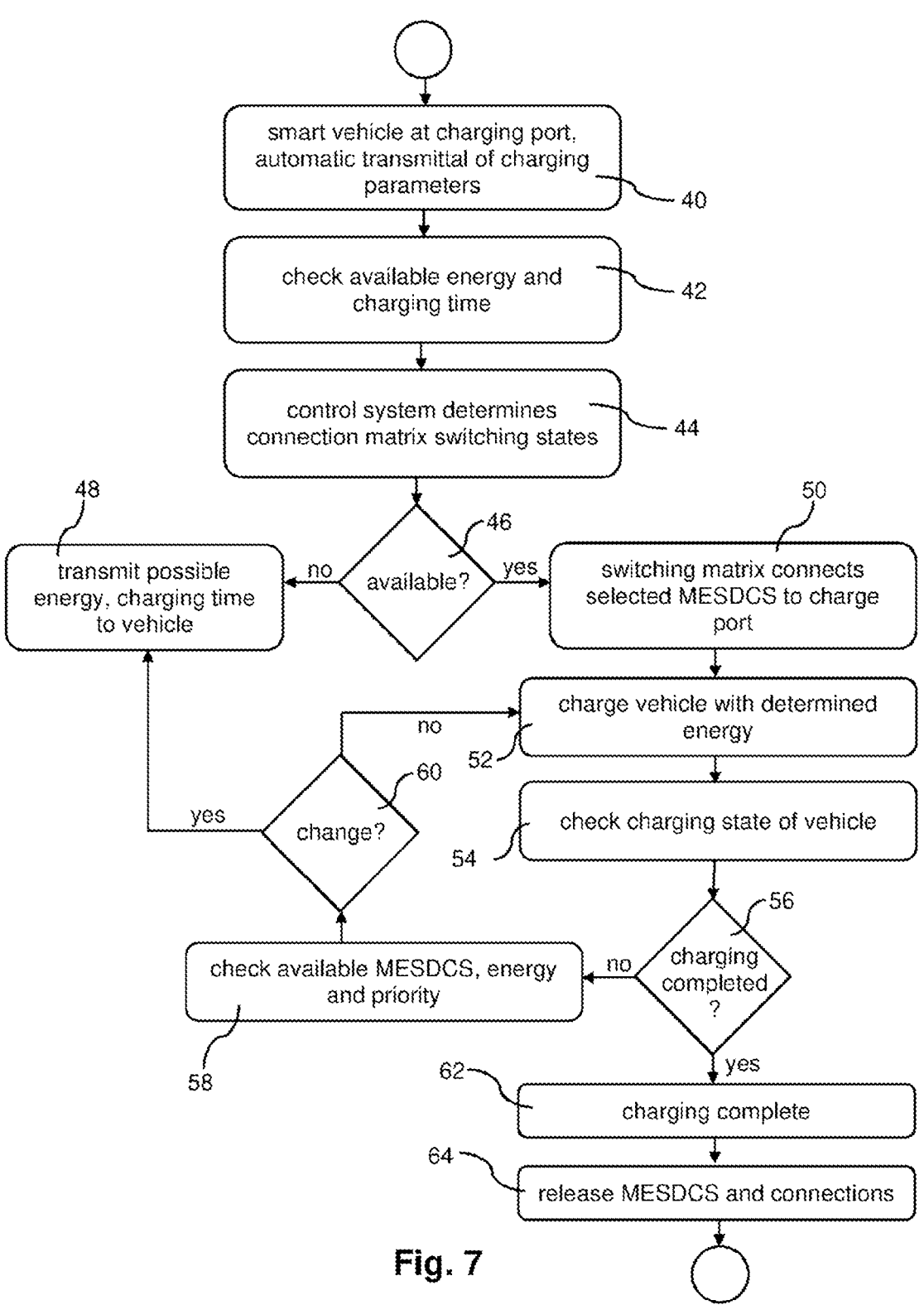
FIG. 7 is a flow diagram illustrating a charging process using the system of FIG. 1 to 4.

Next, with reference to FIG. 7, the operation of the charging system 10 of FIG. 1 to 4 according to one embodiment is described. The procedure summarized in FIG. 7 starts at step 40, at which an electric vehicle 12 is connected to one of the charge ports LPi to LP8. In the example, the vehicle is a "smart vehicle", which automatically transmits charging parameters to the control system 18 via a communication interface associated with the charge port LPj, such as a desired charging voltage and voltage type (DC or AC) and a target charging level, and some parameter related to the charging rate, e.g. an explicit charging rate, a maximum charging period or, similarly, an end of charging time, as well as information regarding a mode of payment and a vehicle or user identification. The interface could be a wire-based interface established when the electric vehicle 12 is electrically connected to the charging port LPj. In addition, or alternatively, charging parameters could also be transmitted via a wireless interface or via communication network as shown under reference signs 32 in FIG. 1. In addition or alternatively to an automatic transmission of charging parameters by the smart vehicle 12, the charging parameters, or additional, more specific charging parameters can be transmitted to the control system 18 using an app installed on a user's portable network enabled device, such as a smart phone 34 (see FIG. 1) or on a terminal provided in each charging port LPj or for a group of charging ports LPj.

In step 42, the control system 18 checks the available energy stored in the available MESDCS Ui, and determines the required charging time for possible charging states, such as single charging state, parallel charging state and serial charging state.

Next, in step 44, the control system 18 determines the switching state of the connection matrix 16, 16A, 16B that would allow establishing the desired charging state. In step 46, it is determined whether a desired charging state can be established that would meet the requested charging parameters. If this is not the case, in step 48, the control system 18 transmits a proposed charging scenario, based on available charging states to the vehicle 12 or to the network enabled portable device 34, offering a possible energy amount that can be provided in the desired time, or a possible charging time for the original requested charging energy. The final decision on the charging parameters can be made by the user or in an automated fashion as a result of a negotiation between the smart vehicle 12 and the control system 18. However, if sufficient MESDCS resources are available to meet the charging demand, the process proceeds to step 50, in which the connection matrix 16, 16A, 16B is switched to connect the one or more selected MESDCS Ui to the charge port LPj to establish the selected charging state (single, parallel or serial charging). Moreover, while not explicitly shown in FIG. 7, if the user agrees upon receipt of the possible energy/charging time in step 48, the procedure likewise proceeds to step 50.

In step 52, the vehicle 12 is charged with the determined energy. During charging, the charging state is regularly checked (step 54) and it is checked in step 56 if the charging is completed. If charging is not completed, the process moves on to step 58, where the availability of the MESDCS, the available energy stored within the MESDCS, and the priority of current charging processes is checked. Then, in step 60, it is checked whether there is a change to the availability of the requested charging resources. For example, the availability can change if in the meantime, another vehicle with a high charging priority connects to another charging port, e.g., a customer who pays extra rates for being guaran-teed maximum charging rate at all times, or where one or more selected MESDCS Ui have to be switched to the aforementioned power source support state in order to stabilize the power network 30. If no change is determined, the process moves again to step 52. However, if there is a change, then the process proceeds to step 48 and transmits an updated possible energy or charging time value to the vehicle 12 or the customer. If there is no answer from the vehicle 12 or the user, in an embodiment, the charging system 10 continues charging with the next highest possible rate available.

If it is determined in step 56 that the charging is completed, this is noted in step 62, and in a subsequent step 64, the MESDCS Ui involved in the charging process of this charge port LPj and the corresponding connections in the connection matrix 16, 16A, 16B are released. Note that the MESDCS Ui used for charging a vehicle 12 may change during the process in order to balance their states of charge, or if they are needed to establish a requested configuration for charging another vehicle 12 or to provide requested grid support, due to the limited number of combinations in the connection matrix 16. If currently used MESDCS are replaced by another subset of MESDCS during the charging process, the user or smart vehicle 12 will not be notified and the charging process will continue as specified in step 46.

Figure 8:
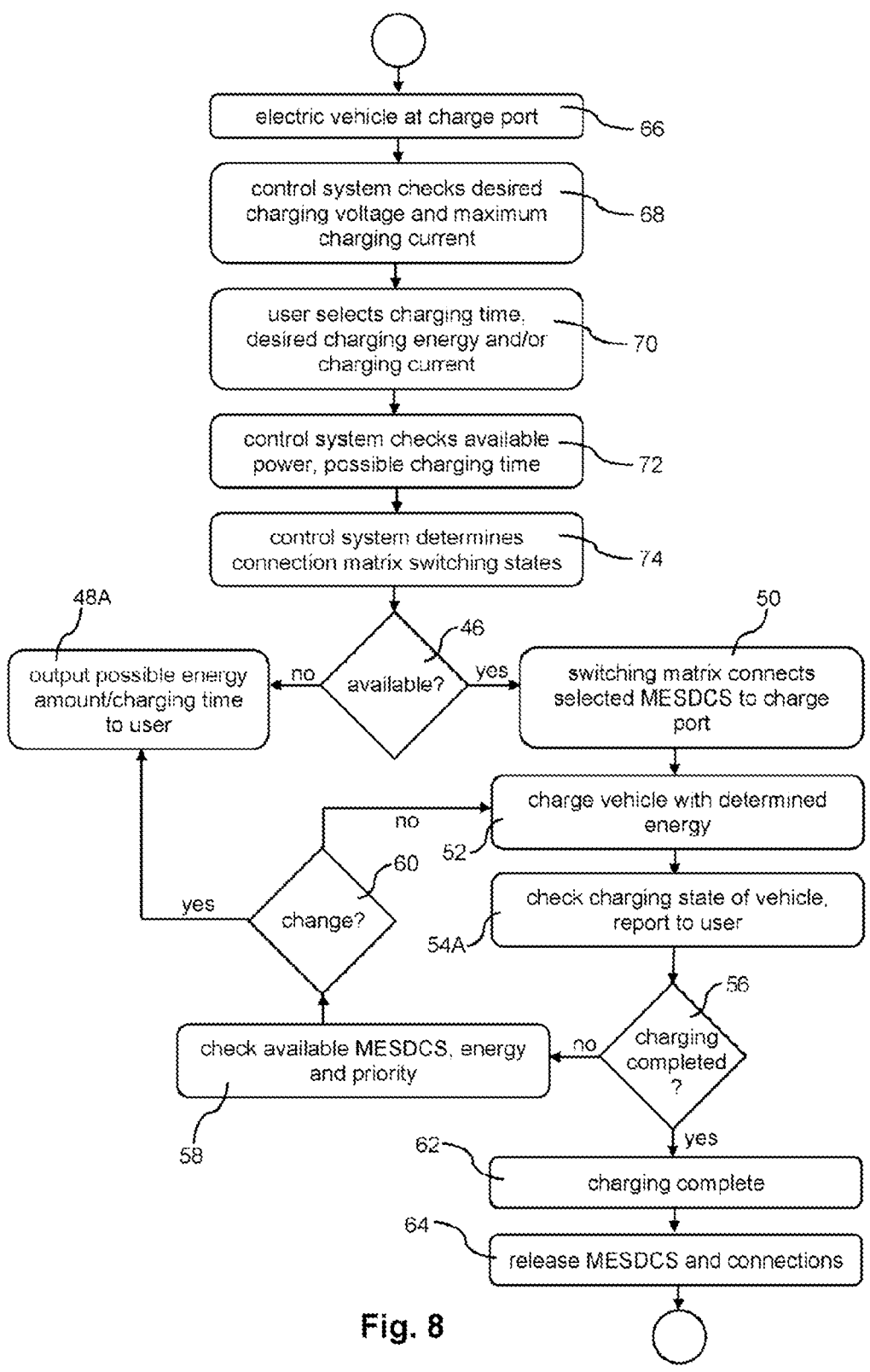
FIG. 8 is a further flow diagram illustrating a charging process using the charging system of FIG. 1 to 4.

FIG. 8 shows a closely related process, which mainly differs by the way the user communicates with the control system 18. In particular, steps 44 to 64 are largely identical to those of FIG. 7 and do not need to be recited again. The system starts in step 66 with connecting the vehicle 12 to a charge port LPj. In step 68, the control system 18 checks only the charging voltage and the maximum charging current, but not further charging parameters, such as charging time. Instead, further charging parameters, such as charging time, desired charging energy and/or charging current are selected by the user in step 70, preferably via an app installed on his/her network enabled portable device 34. Then, in step 72, the control system 18 checks available power, and the possible charging time. The following steps 44 to 64 are generally identical to those described in FIG. 7, except that in steps 48A and 54A, the report about the charging state and the information regarding possible energy amount/charging time is communicated to the user. This embodiment is particularly useful in cases where the charging system 10 is associated with a parking facility, at which the user leaves his/her vehicle for an extended period of time.

For example, the charging system could be installed in a parking garage at an airport. A user may arrive at the airport and leave his/her car in the parking facility for two days. Then, in step 70, the user could select a parking time of 48 hours and specify that during this time, his battery should be charged up to 75%, so that he/she can safely drive home from the airport. Since the charging demand per vehicle in such a scenario is very low, there can be a large number of charge ports LPj served by a comparatively small number of MESDCS Ui. Moreover, the battery of a parked car can be used as an energy buffer for the charging system 10, and for the power network 3o as whole. During the extended stay in the parking facility, there may phases of high power demand on the power network 30, and in this case, power from the vehicle batteries can be transferred to the power network 3o via the reversed charging state and the power source support state. During these times, the vehicle owners can sell energy stored in their vehicle battery to the power network. Conversely, there will be times where there is excess power in the power network 30, and where the consumer gets the power practically for free, or is even paid for consuming power from the network. During this period, the energy storage elements of the MESDCS Ui and the batteries of the vehicles 12 will be preferably charged.

Moreover, the energy buffering capacity of the MESDCS Ui and of the batteries of vehicles 12 connected to the charging system 10 can not only be used to support the power network 30, but also to support an energy consuming entity with which the charging system 10 is associated. An example of such an energy consuming entity could be the airport referred to in the previous paragraph, but could also be a factory, a train station, hospital or more generally a building or a group of buildings, where the energy consuming entity has a local electricity network which under normal operation is supplied with electrical power by a power network. In this case, the charging system 10 as well as the batteries of the vehicles 12 currently connected to it can act as a buffer for an emergency backup in case of power failure of the power network 30, or to support the local electric network in case of transient times of high power demand. Such transient power demand can e.g., occur in factories, where a certain machine is started up say only once a day and an excessive amount of energy is needed for this, while the average demand over the day is much less. In this case, the local electric network can be supported by a charging system 10 during the transient peak energy period. This is also referred to as "peak shaving" in the art.

For this embodiment, the charging system 10 includes a switching arrangement allowing for coupling some or all of the MESDCS Ui of the charging system 10 with the local electric network for supplying said local electric network with electrical power. Moreover, the control system 18 is configured to establish an associated entity supply mode, in which it controls the output voltages of the MESDCS Ui coupled with the local electric network to provide power of a desired voltage to said associated entity.

The energy consuming entity then has a switching arrangement allowing for decoupling the local electricity network from the power network 30. This way, it can be ensured that the energy provided in the associated entity supply mode will be used for this entity only, and not dissipate through the currently in-operative local electric network 30. FIG. 9 to 19 illustrate various embodiments of the MESDCS Ui as shown in FIG. 1 to 4. Background on MESDCS is disclosed in DE 10 2017 110 410, WO2016/012247 A1 and WO2018/122094 A1, incorporated herein by reference.

Figures 9, 10, 11:
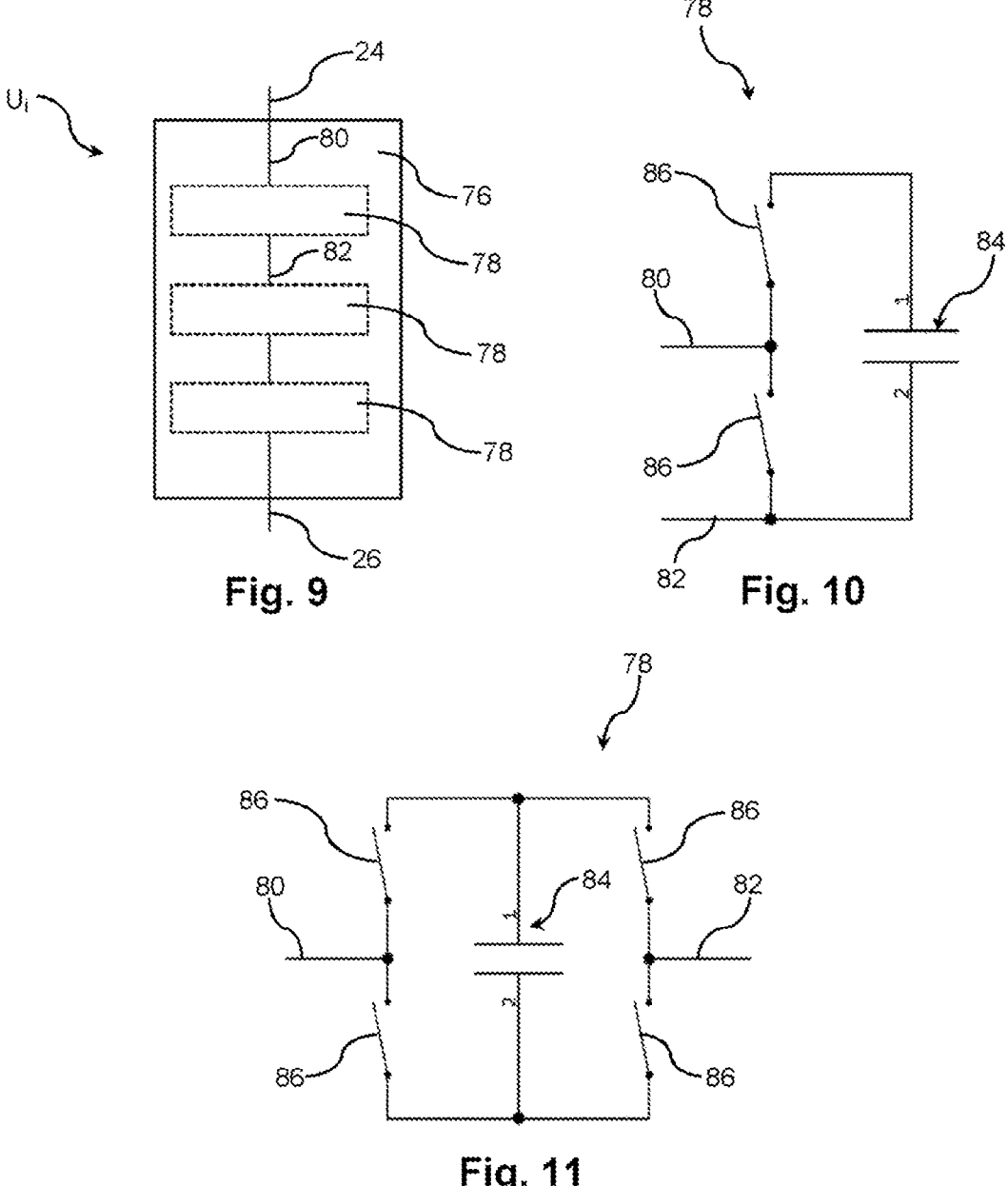
FIG. 9 is a schematic representation of a MESDCS.
FIGS. 10 and 11 show modules that can be used in the MESDCS of FIG. 9.

FIG. 9 shows the general structure of a MESDCS Ui according to an embodiment of the invention. The MESDCS Ui includes a converter arm 76 having a first end 24 and a second end 26 and which includes a plurality of sequentially interconnected modules 78. While in FIG. 9, only three exemplary modules 78 are shown for illustration purposes, in actual MESDCS, the number of modules 78 can be several tens or even hundreds. In the simplest version, each module 78 has only one first terminal 8o and one second terminal 82. Examples of such modules 78 are shown in FIG. 10 and FIG. 1i. Moreover, each module 78 includes an energy storage element 84 or energy conversion element, which in the illustrations of FIG. 10 to 16 is for simplicity represented by a capacitor symbol. However, in the embodiment the element 84 is a battery. Different types of batteries can be used in the module 78 e.g., lithium NMC, LFP, or LTO batteries. Moreover, each module 78 includes a plurality of module switches 86. In the converter arm 76, in each two adjacent modules 78, the first terminal 80 of one module is connected with at least one second terminal of the other module 78.

The generic symbols for the switches 86 could resemble transistors, in particular MOSFET or bipolar transistors, IGBTs or switchable thyristors.

In the module 78 shown in FIG. 10, by operating the switches 86, the battery 84 can be either deactivated or it can be connected in series with the battery 84 of an adjacent module 78. The module 78 shown in FIG. 10, which has a full bridge topology, likewise allows for deactivating or "bypassing" the battery 84 and connecting batteries 84 of adjacent modules 78 in series, but also allows for reversing the polarity of the battery 84 in the connection, which is referred to as "connection in anti-series" for simplicity herein. This connection in "anti-series" allows for changing the polarity of the entire converter arms 76 as a whole, which is necessary for handling AC voltages, and is also necessary for the establishing the series connection in the connection matrix 16, 16A, 16B of FIG. 3, where e.g., the converter arms 76 of the MESDCS U4 and U5 have a different polarities.

The voltage of the entire converter arm 76, or in other words, the output voltage of the MESDCS Ui, corresponds to the sum of the voltages of the batteries 84 that are currently selected in series. By deactivating (i.e., bypassing) batteries 84 in certain modules, the voltage can be decreased, and by activating previously deactivated batteries 84, the voltage can be increased. Since the number of modules 78 is limited, the output voltage can in particular only acquire discrete states. However, due to the typically very large number of modules, the output voltage is sufficiently smooth for the purposes of charging, or establishing a power source support state or a local network support state. Moreover, the effective voltage can be smoothed by connecting and deactivating the battery 84 in one of the modules 78 rapidly in a pulse-width-modulation (PWM)-like manner. Please note that while not shown in detail in the figures, for each arm 76, fil-ter elements may be provided at the end 24 and/or 26, such as choking inductances or capacitors. A capacitor allows for smoothing the voltage, which is particularly useful in PWM operation. The choke inductance allows for smoothing the current, which allows for meeting network regulations, and also allows for limiting a current rise rate in case of malfunctions. Typical configurations could involve L-filters, LC-filters or LCL filters.

Figures 12, 13, 14, 15, 16:
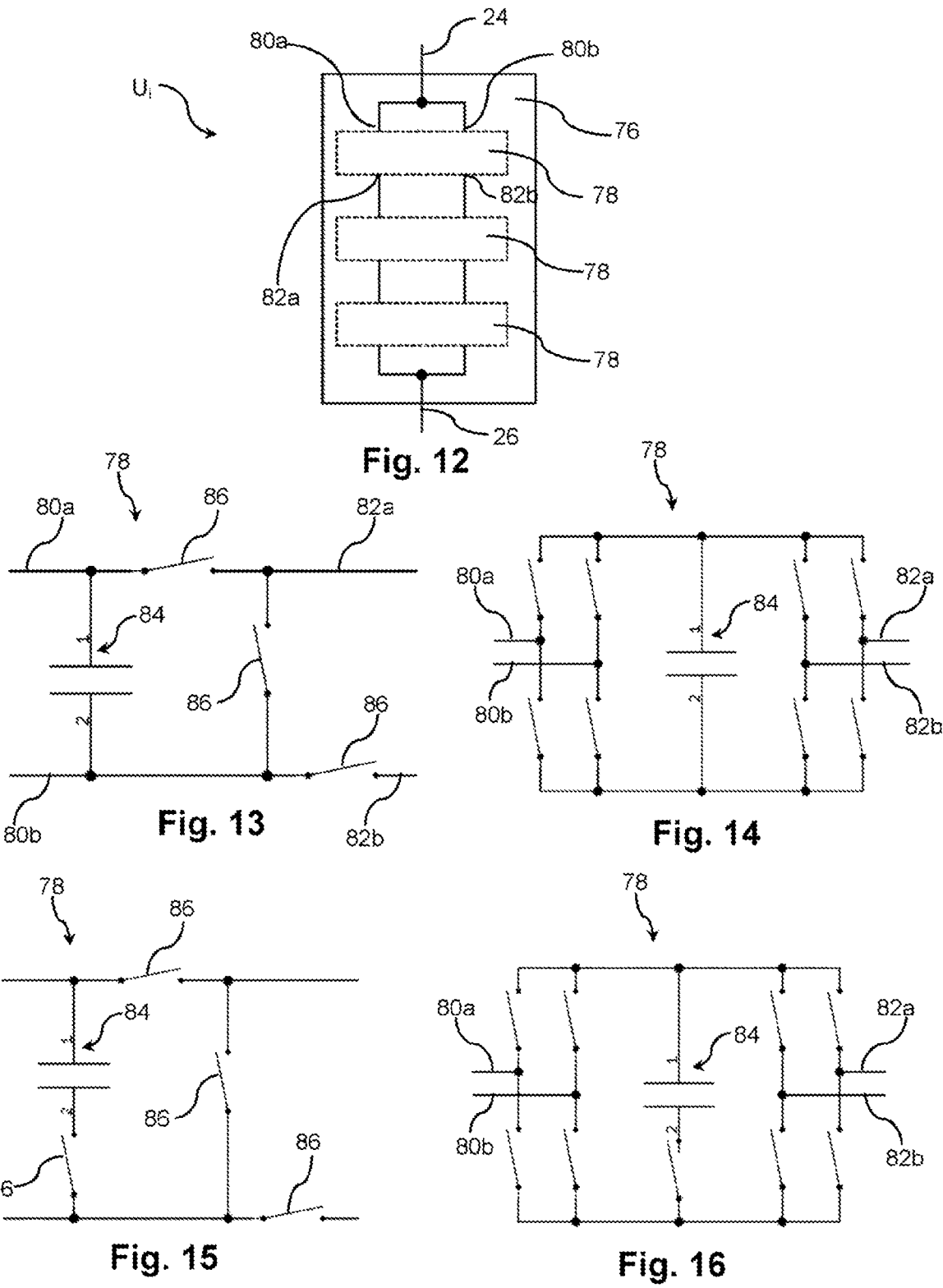
FIG. 12 is a schematic illustration of a further MESDCS.
FIGS. 13 to 16 illustrate modules that can be used in the MESDCS of FIG. 12.

FIG. 12 shows a schematic example of a further MESDCS Ui, which likewise includes a converter arm 76 comprising cascaded modules 78, with a main difference that in this case, each module 78 has two first terminals 80a, 80b and two second terminals 82a, 82b.

In the modules 78 having two first and two second terminals 80a, 80b and 82a, 82b, respectively, the batteries 84 can not only be deactivated and connected selectively in series, but can also be connected in parallel, thereby limiting the internal resistance and hence the losses as compared to the MESDCS with only one first and second terminal 80, 82, each. FIG. 13 shows a module 78, which allows for selectively connecting batteries 84 of adjacent modules 78 either in parallel or in series, although it includes only three switches 86. However, this module does not allow for changing the polarity of the voltage. FIG. 17 shows several of the modules of FIG. 13 connected in series, where a further switching arrangement 88 is provided that allows for inverting the polarity of the entire converter arm 76. Accordingly, although the batteries 84 of the module 78 of FIG. 13 cannot be connected in "anti-series", the polarity of the converter arm 76 as a whole can be inverted. The same applies for the module of FIG. 8, which likewise cannot be connected in "anti-series". Instead of providing the further switching arrangement 88 for inverting the polarity of the converter arm as a whole, it is possible to provide a converter arm comprising two bridge branches connected with each other and provide for the terminal at the connection point, as is shown in FIG. 5 of the seminal patent application DE1o217889 A1 of Marquardt.

FIG. 14 shows a module 78 that provides a higher degree of flexibility. By operating its switches 86, batteries 84 of adjacent modules 78 can be selectively connected in series, in anti-series and in parallel.

FIG. 15 shows a variant of the module of FIG. 13, where an additional switch is provided to deactivate its battery 84 when switched in parallel. Similarly, the module of FIG. 16 is a modification of the module of FIG. 14, where an additional switch is likewise provided which allows for deactivating its battery 84. The modules of FIGS. 15 and 16 do not only allow for connecting adjacent modules 78 in parallel, but also for connecting modules in parallel which are separated by an arbitrary number of modules 78 with deactivated battery 84. Accordingly, there is a large degree of freedom as to which batteries 84 ought to be connected in parallel. This is important, because one wishes to connect only those batteries 84 in parallel which have equal voltages, or voltages that differ only minimally, in order to avoid balancing currents between these batteries 84, which would lead to unwanted losses. The control system 18 can monitor the voltages of each individual battery 84 and can ensure that the voltages of batteries 84 are balanced by the way they are employed in the generation of the output voltage. For example, batteries 84 with a higher charging state and hence higher voltage would be preferably used in the series connection in an energy outputting mode, such as one of the charging states, the power network support state or the local network support state. Conversely, in the reverse charging state, or when the MESDCS is connected to be charged by a corresponding phase of the power network 30, batteries with a lower charging level and hence lower voltage would be preferably connected to the charging, while batteries with a higher charging level would at first be deactivated. Only when two batteries reach the same or at least similar voltage, they will be connected in parallel. For this switching strategy, it is important that the batteries 84 of module 76 which are not directly adjacent, but are separated by one or more modules 76 with deactivated battery 84, can nevertheless be switched in parallel, which is made possible by the module 78 as shown in FIG. 15 and FIG. 16.

This is shown in more detail in FIG. 17, FIG. 18, and FIG. 19 with regard to the module 76 of FIGS. 15 and 16, where the second and fourth module 78 in the cascaded connection are connected in parallel, with the third module 78 with deactivated battery 84 in between, and this parallel connection is then connected in series with the first module 78.

Figure 20:
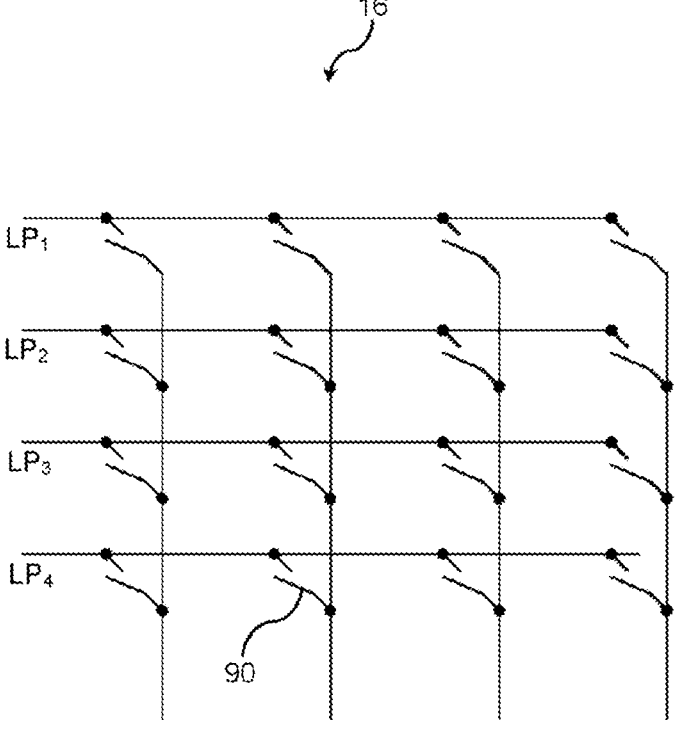
FIG. 20 is a schematic representation of a switchable connection matrix.

Finally, FIG. 20 schematically shows the principle of the switching matrix 16, in which crossing conductors can be selectively connected at each crossing point using a suitable switch 90. As mentioned before, it is not possible but necessary that such switch 90 is provided at each crossing of the conductors.

It will be appreciated to those skilled in the art having the benefit of this disclosure that this invention is believed to provide a charging system for electric vehicles. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as some embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 charging system
12 electric vehicle
14 interface
16 matrix
16A first part of matrix 16
16B second part of matrix 16
18 control system
20 first terminal of matrix 16
22 second terminal of matrix 16
24 first end of MESDCS
26 second end of MESDCS
28 third terminal
30 power network
30A, 30B, 30C phases of power network 30
32 network
34 smart phone
40 to 70 process steps
76 converter arm
78 module
80, 80_a_, 80_b_ first terminal
82, 82_a_, 82_b_ second terminal
84 battery
86 module switch
88 switching arrangement
90 switch
Ui modular energy storage direct converter (MESDCS)
LPj charging point

The invention claimed is:

1. A charging system for electric vehicles, comprising:
a number N of charge ports, each charge port having an interface for power exchange with an electric vehicle, wherein N is an integer greater than 1,
a number M of modular energy storage direct converter systems (MESDCS), wherein M is an integer greater than zero,
a switchable connection matrix, and
a control system,
wherein each MESDCS comprises a converter arm having a first end and a second end and comprising a plurality of sequentially interconnected modules, wherein each module of said plurality of sequentially interconnected modules comprises:
at least one first terminal and at least one second terminal,
a storage element configured for storing of electrical energy or an energy conversion element, and
a plurality of module switches,
wherein in each two adjacent modules, of the plurality of sequentially interconnected modules, the at least one first terminal of a first adjacent module is connected either directly or via an intermediate component to the at least one second terminal of a second adjacent module, wherein said plurality of module switches is configured to provide a short circuit between the at least one first terminal and the at least one second terminal, or to connect the storage element or energy conversion element between the at least one first terminal and the at least one second terminal, wherein said control system is configured to control an output voltage of each MESDCS, based on information regarding a current charge state of the storage element or voltage or output power of the energy conversion element, and by actuating at least a part of said plurality of module switches depending on said information to have the converter arm supply said output voltage, and wherein said switchable connection matrix is configured to connect, under control of said control system, one or more selected MESDCS with at least one charge port, and is further configured to connect the one or more selected MESDCS, of said number M of MESDCS, with a power source, and wherein the control system is configured to ensure that no MESDCS is simultaneously connected to the power source and to the at least one charge port;

wherein the connection matrix is configured to connect, under control of said control system, the one or more selected MESDCS directly or indirectly with a ground associated with the power source, when said one or more selected MESDCS is connected with a phase of said power source, and to disconnect said one or more selected MESDCS from the ground of the power source when said one or more selected MESDCS is/are connected with the at least one charge port and to connect said one or more selected MESDCS to directly or indirectly to the ground of the at least one charge port.

2. The charging system of claim 1, wherein for charging an electric vehicle at a given charge port of the charge ports with a desired charging voltage, the control system is configured to establish at least two of the following charging states:

a single charging state, in which the control system controls the output voltage of a selected MESDCS to match said desired charging voltage at said given charge port, and controls the connection matrix to connect only the selected MESDCS to said given charge port, a parallel charging state, in which the control system controls the output voltages of at least two selected MESDCS to each output voltage match said desired charging voltage at said given charge port, and controls the connection matrix to connect each of the at least two selected MESDCS to said given charge port, and a serial charging state, in which the control system controls output voltages of a group of two or more selected MESDCS such that a sum of the output voltages matches said desired charging voltage at said given charge port, and controls the connection matrix to connect said group of two or more selected MESDCS in series and to connect said serially connected group to said given charge port.

3. The charging system of claim 1, wherein said control system is configured to establish a reverse charging state, in which the control system controls the output voltage of the one or more selected MESDCS to a value lower than a current voltage of a battery of an electric vehicle connected to a given charge port of the charge ports, and controls the switchable connection matrix to connect said one or more selected MESDCS to said given charge port, such that energy storages within said one or more selected MESDCS are charged with power received from the battery of said electric vehicle connected to said given charge port.

4. The charging system of claim 1, wherein said control system is configured to establish a power source support state, in which the control system controls an output voltage of the one or more selected MESDCS to a value higher than that of a voltage of the power source and controls the connection matrix to connect said one or more selected MESDCS to said power source.

5. The charging system of claim 4, wherein said switchable connection matrix is configured to connect said one or more selected MESDCS to a given phase conductor of said power source, wherein the control system is further configured to control the output voltage of said one or more selected MESDCS to follow a time varying phase voltage of a power source phase to establish a power flow from and into the charging system for grid support applications including peak shaving, load leveling, flicker compensation, power factor correction, frequency containment reserve, frequency regulation, capacity firming, spinning reserve, and power or voltage quality.

6. The charging system of claim 1, wherein said switchable connection matrix has a first part, said first part comprising N first terminals each of which is connected with a corresponding one of said N charge ports, and M second terminals each of which is connected with a first end of a corresponding MESDCS, and wherein said switchable connection matrix is switchable, under control of said control system, to selectively connect each of said first terminals with selected one or more second terminals of the M second terminals.

7. The charging system of claim 6, wherein said first part of said switchable connection matrix further comprises a number L of third terminals each of which is connected to a corresponding phase of said power source or to ground, wherein said switchable connection matrix is switchable, under control of said control system, to selectively connect each of said third terminals with selected one or more second terminals.

8. A method of operating a charging system for electric vehicles, said charging system comprising:

a number N of charge ports, each charge port having an interface for power exchange with an electric vehicle, where N is an integer greater than 1, a number M of modular energy storage direct converter systems (MESDCS), each MESDCS comprising a converter arm having a first end and a second end, wherein M is an integer greater than zero, a switchable connection matrix, and a control system, wherein said method comprises configuring at least one of the MESDCS, the at least one of the MESDCS including a plurality of sequentially interconnected modules, wherein in each two adjacent of said sequentially interconnected modules at least one first terminal of one module either directly or via an intermediate component is connected to at least one second terminal of the other module, and controlling an output voltage of each MESDCS based on information regarding a current charge state of the storage elements or voltage or output power of energy conversion elements, by actuating at least a part of a plurality of module switches depending on this information for providing a short circuit between the at least one first terminal and the at least one second terminal, or for connecting the storage elements configured for storing of electrical energy or the energy conversion elements between the at least one first terminal and the at least one second terminal, such that the converter arm as a whole supplies said output voltage, and wherein said method comprises not having connected one or more selected MESDCS with each given charge port and the one or more selected MESDCS with a power source at the same time, wherein the method is carried out to constantly avoid simultaneous connection of any MESDCS is simultaneously connected to the power source and to a charge port, of the charge ports, wherein the method preferably further comprises selectively connecting, by means of said connection matrix, one or more MESDCS directly or indirectly with a ground associated with the power source when said one or more selected MESDCS is connected with a phase of said power source, and disconnecting said one or more MESDCS from the ground of the power source when said one or more selected MESDCS are connected with said charge Port.

9. The method of claim 8, wherein, for charging an electric vehicle at a given charge port with a desired charging voltage, the method comprises establishing at least two of the following charging states:

a single charging state, in which the control system controls the output voltage of a selected MESDCS to match said desired charging voltage at said given charge port, and controls the connection matrix to connect only the selected MESDCS to said given charge port, a parallel charging state, in which the control system controls each of output voltages of at least two selected MESDCS to match said desired charging voltage at said given charge port, and controls the connection matrix to connect each of the at least two selected MESDCS to said given charge port, and a serial charging state, in which the control system controls output voltages of a group of two or more selected MESDCS such that a sum of said output voltages of the group of the two or more selected MESDCS matches said desired charging voltage at said given charge port, and controls the connection matrix to connect said group of two or more selected MESDCS in series and to connect said serially connected group to said given charge port.

10. The method of claim 8, wherein said method further comprises establishing a reverse charging state, in which the output voltage of one or more selected MESDCS is controlled to assume a value lower than a current voltage of a battery of an electric vehicle connected to a given charge port and the switchable connection matrix is controlled to connect said one or more selected MESDCS to said given charge port, such that energy storages within said one or more selected MESDCS are charged with power received from the battery of said electric vehicle connected to said given charge port.

11. The method of claim 8, wherein said method further comprises establishing a power source support state, in which an output voltage of one or more selected MESDCS is controlled to assume a value higher than a voltage of the power source and the connection matrix is controlled to connect said one or more selected MESDCS to said power source.

12. The method of claim 11, wherein connecting said one or more selected MESDCS to said power source in said power source support state comprises connecting said one or more selected MESDCS to a given phase conductor of said power source, wherein the method further comprises controlling the output voltage of said one or more selected MESDCS to follow a time varying phase voltage of a power source phase to establish a power flow from and into the charging system for grid support applications including peak shaving, load leveling, flicker compensation, power factor correction, frequency containment reserve, frequency regulation, capacity firming, spinning reserve, and power or voltage quality.

13. The method of claim 8, wherein said switchable connection matrix has a first part, said first part comprising N first terminals each connected with a corresponding one of said N charge ports, and M second terminals, each connected with a first end of a corresponding MESDCS, and wherein said switchable connection matrix is switchable, under control of said control system, to selectively connect each of said first terminals with selected one or more second terminals.

14. The method of claim 13, wherein said first part of said switchable connection matrix further comprises a number L of third terminals each connected to a corresponding phase of said power source or to ground, wherein said method comprises selectively connecting each of said third terminals with selected one or more second terminals of the M second terminals.

* * * * *